United States Patent
Neate et al.

(10) Patent No.: US 12,378,013 B2
(45) Date of Patent: Aug. 5, 2025

(54) UNMANNED AERIAL VEHICLE LANDING PLATFORM WITH TETHER PASSTHROUGH SYSTEMS AND METHODS

(71) Applicant: FLIR Unmanned Aerial Systems ULC, Vancouver (CA)

(72) Inventors: Christopher Neate, Victoria (CA); James Infanti, Waterloo (CA); Albert Pegg, New Dundee (CA)

(73) Assignee: FLIR Unmanned Aerial Systems ULC, Vancouver (CA)

(*) Notice: Subject to any disclaimer, the term of this patent is extended or adjusted under 35 U.S.C. 154(b) by 0 days.

(21) Appl. No.: 18/627,378

(22) Filed: Apr. 4, 2024

(65) Prior Publication Data

US 2024/0336378 A1  Oct. 10, 2024

Related U.S. Application Data

(60) Provisional application No. 63/494,689, filed on Apr. 6, 2023.

(51) Int. Cl.
  *B64U 10/60*   (2023.01)
  *B64U 70/50*   (2023.01)
  *B64U 70/92*   (2023.01)

(52) U.S. Cl.
  CPC ............ *B64U 10/60* (2023.01); *B64U 70/50* (2023.01); *B64U 70/92* (2023.01); *B64U 2201/202* (2023.01)

(58) Field of Classification Search
  CPC ........ B64U 10/60; B64U 70/50; B64U 70/92; B64U 2201/202; B64F 3/02
  See application file for complete search history.

(56) References Cited

U.S. PATENT DOCUMENTS

| | | | |
|---|---|---|---|
| 9,056,676 B1* | 6/2015 | Wang | B64F 1/22 |
| 10,007,272 B2* | 6/2018 | Tirpak | G05D 1/042 |
| 10,875,648 B2* | 12/2020 | Schmalzried | B64C 39/024 |
| 11,420,771 B2* | 8/2022 | Bostick | H02J 1/08 |
| 11,993,161 B2* | 5/2024 | Johnson | B64D 27/34 |
| 2015/0274294 A1* | 10/2015 | Dahlstrom | B05B 13/0278 239/722 |

(Continued)

OTHER PUBLICATIONS

Galimov, Musa et al., "UAV Positioning Mechanisms in Landing Stations: Classification and Engineering Design Review," Jul. 2020, Sensors (Basel).

(Continued)

*Primary Examiner* — Justin M Benedik
(74) *Attorney, Agent, or Firm* — Haynes and Boone, LLP

(57) ABSTRACT

Systems and methods related to unmanned aerial vehicle (UAV) launch/landing platforms for tethered UAV flights are provided. A system includes a container configured to store a UAV includes a housing and one or more doors and a tether passthrough system configured to provide a tether pathway for a tether from an interior of the housing to the UAV through the at least one door during a tethered UAV flight. The tether passthrough system includes a tether guide configured to move between a first position facilitating storage of the UAV and a second position fitting securely within an opening of at least one door. A plug or cover may be adapted to close the opening when the doors are closed to protect the interior of the housing.

20 Claims, 16 Drawing Sheets

(56) References Cited

U.S. PATENT DOCUMENTS

2017/0043872 A1* 2/2017 Whitaker ................ B64C 27/00
2020/0033846 A1* 1/2020 Buyse .................... B64F 1/362
2020/0094989 A1   3/2020 Hundemer
2020/0231279 A1* 7/2020 Buyse .................... B64U 10/60
2021/0362856 A1* 11/2021 Hashiguchi ............ B64U 10/60

OTHER PUBLICATIONS

"Tethered drone for US & Canada Law Enforcement offered by Axon & Fotokite," Sep. 23, 2020, FOTOKITE.
"SAMS-T," Dec. 2020, ICAROS Aerial Intelligence.

* cited by examiner

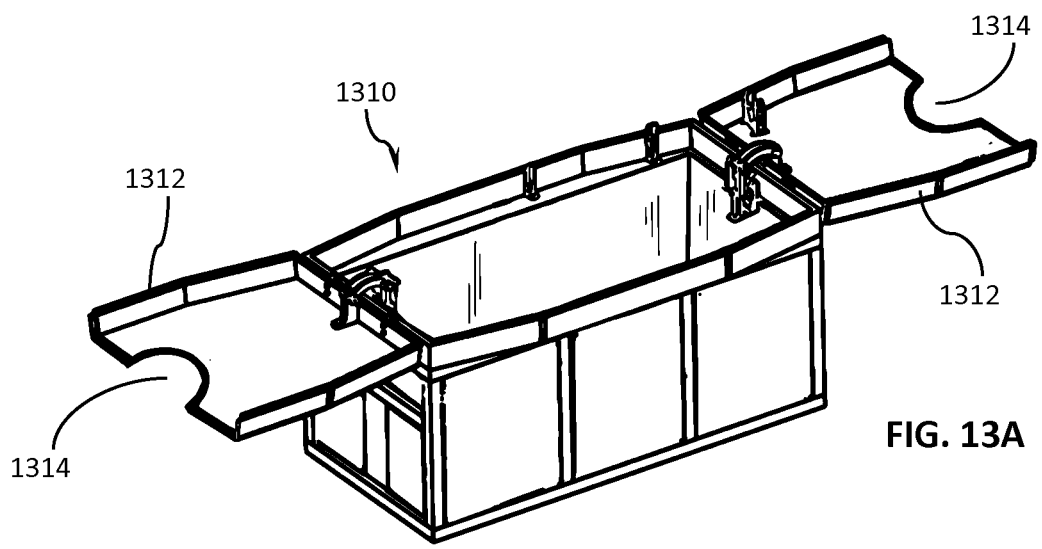
FIG. 13A
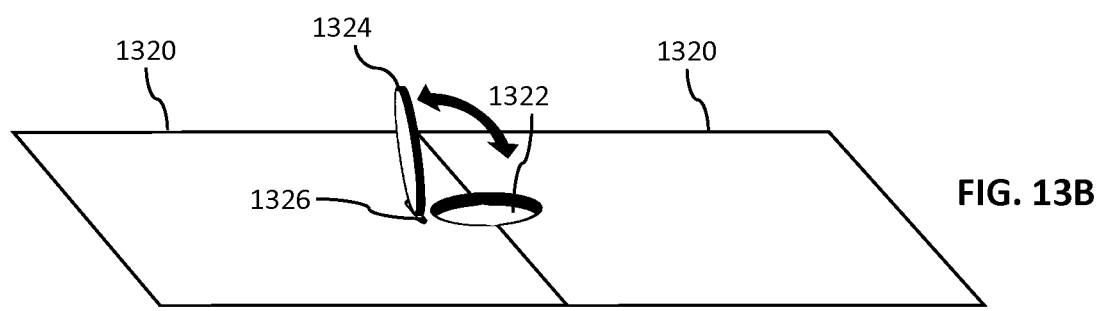
FIG. 13B
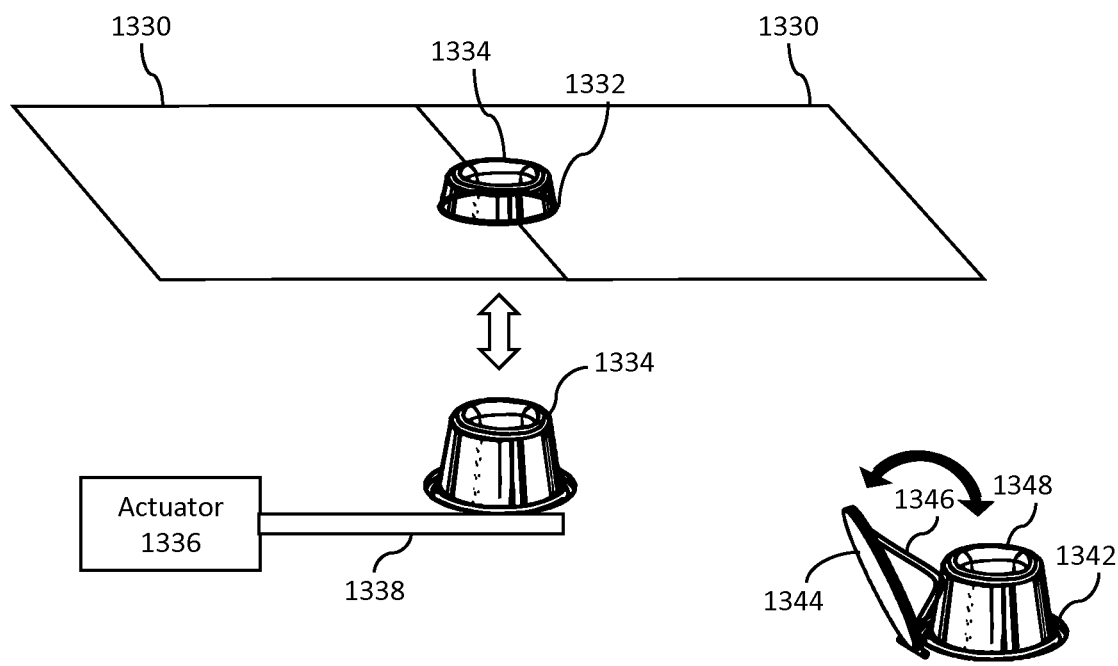
FIG. 13D
FIG. 13C

UNMANNED AERIAL VEHICLE LANDING PLATFORM WITH TETHER PASSTHROUGH SYSTEMS AND METHODS

CROSS REFERENCE TO RELATED APPLICATIONS

This application claims priority to and the benefit of U.S. Provisional Patent Application No. 63/494,689 filed Apr. 6, 2023 and entitled "UNMANNED AERIAL VEHICLE LANDING PLATFORM WITH TETHER PASSTHROUGH SYSTEMS AND METHODS," which is incorporated herein by reference.

TECHNICAL FIELD

The present disclosure relates generally to unmanned aerial vehicles and, more particularly, to launch/landing systems and methods for tethered unmanned aerial vehicles.

BACKGROUND

Modern unmanned sensor platforms, such as unmanned aerial vehicles (UAVs), are able to operate over long distances and in various environments (e.g., rural, urban, undeveloped). In particular, UAVs are used to support a wide range of real-world applications including surveillance, reconnaissance, exploration, item transportation, disaster relief, aerial photography, large-scale agriculture monitoring, and other untethered or tethered applications. In conducting various missions, a UAV may have to land and take-off, often from mobile platforms (e.g., from a moving vehicle) and/or from platforms positioned on uneven or off-angle terrain.

In many military and civilian operations, it may be desirable to have personnel remain in positions where they are protected, such as inside a vehicle, away from a UAV landing and launch platform. In such scenarios, launching, landing, and storing a UAV with minimal involvement of personnel is desired. Conditions such as wind and movement of a mobile platform may further complicate launching from and landing on a platform.

Thus, there exists a need for UAV landing platform systems and methods that address the deficiencies noted above, other deficiencies known in the industry, or at least offers an alternative to current techniques.

SUMMARY

In one or more embodiments, systems and methods include a container configured to store, launch, and land a tethered unmanned aerial vehicle (UAV). In some embodiments, the container includes a housing and one or more doors configured to enclose the tethered UAV therein on a platform. The one or more doors are configured to open to allow launching of the tethered UAV and to close to protect the internal components of the container during flight. In various embodiments, the container is configured with a tether management system that includes a tether passthrough system allowing the tether to passthrough the closed doors during flight.

In various embodiments, a system includes a container configured to store an unmanned aerial vehicle (UAV), the container comprising a housing and one or more doors, a platform secured within the container and adapted for launching and landing the UAV, and a tether passthrough system configured to provide a tether pathway for a tether from an interior of the housing to the UAV through the at least one door during a tethered UAV flight. The system may further include a tether management system secured within the housing, such that the tether has a first end attached to the tether management system and a second end attached to the UAV.

In some embodiments, the tether passthrough system includes a tether guide configured to move between a first position facilitating storage of the UAV and a second position during the tethered UAV flight. At least one door may be configured to move between a closed position substantially covering an interior of the housing and an open position providing access to the interior of the housing facilitating launching and landing of the UAV. An opening may be formed in the at least one door such that the tether guide, when in the second position, is configured to fit securely within the opening, allowing the tether to pass through the at least one door. In some embodiments, the at least one door includes two adjoining doors and the opening may be formed as a substantially circular opening comprising a half circular opening formed in each of the two adjoining doors.

In some embodiments, a plug may be adapted to fit securely into the opening when the doors are closed to protect the interior of the housing. An actuator and assembly may be configured to position the plug into the opening during UAV storage, and position the plug outside of the opening during the tethered UAV flight. In other embodiments, a cover may be hingedly attached to the door and biased to close over the opening. The cover may be held open by the tether guide when the tether guide is in the second position.

In some embodiments, a method which may be performed by one or more system described herein, including one or more logic devices, includes storing an unmanned aerial vehicle (UAV) in a launch/land container comprising a housing, one or more doors having at least one opening formed therein, a platform secured within the container and positionable between a storage position and a launch/land position, and a tether passthrough system. The method may further include positioning the one or more doors and the platform to launch the UAV, comprising opening the one or more doors and raising the platform to the launch position, positioning the tether passthrough system for tethered UAV flight, and closing the one or more doors around the tether passthrough system, the tether passthrough system providing a pathway for a tether from an interior of the housing to the UAV during a tethered UAV flight.

In some embodiments, the method further includes opening the one or more doors, retracting the tether passthrough system to the platform to facilitate landing the UAV, and closing the one or more doors to store the UAV in the launch/land container. The method may further include operating a tether management system to extend and/or retract the tether during UAV flight, wherein the tether has a first end attached to the tether management system and a second end attached to the UAV.

The scope of the disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 13A illustrates an example container having openings in the doors for a tether management system, in accordance with one or more embodiments of the present disclosure.

FIG. 13B illustrates an example cover for the openings of FIG. 13A, in accordance with one or more embodiments of the present disclosure.

FIG. 13C illustrates a tether guide inserted into the opening of FIG. 13A, in accordance with one or more embodiments of the present disclosure.

FIG. 13D illustrates an example cover for the opening of FIG. 13A that is held open by a tether guide, in accordance with one or more embodiments of the present disclosure.

Figure 1A:
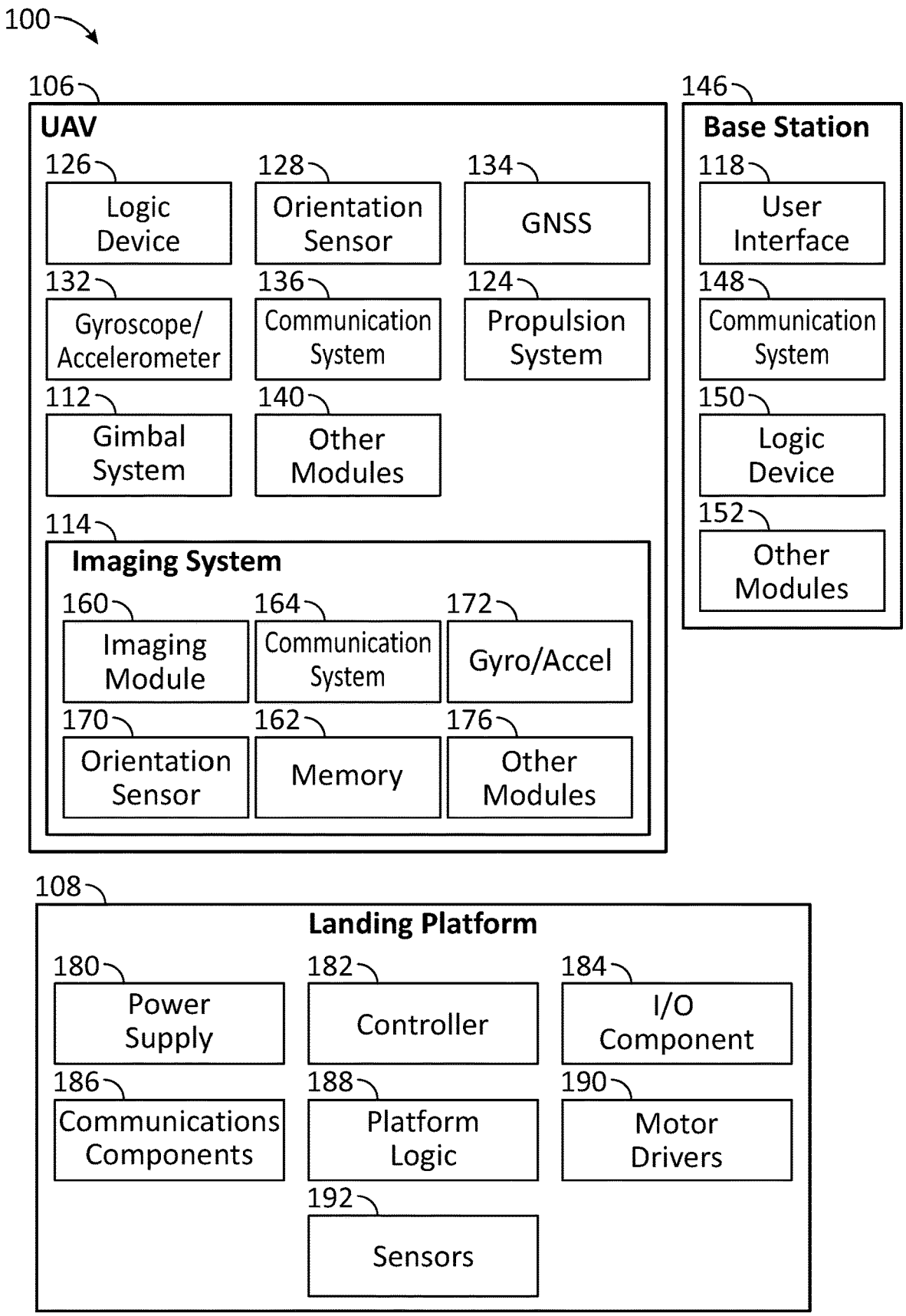
FIG. 1A illustrates a block diagram of a system, in accordance with one or more embodiments of the present disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various systems and methods related to a UAV landing and/or launch platform are provided. In one example, a platform for launching and/or landing a UAV includes a support plate adapted to support the UAV, folding elements adapted to facilitate landing and positioning of the UAV on the support plate, and one or more motors configured to position the support plate for launch, landing, and storage. A system and method may include the UAV, the platform, and a logic device configured to control the one or more motors to position the support plate and control other motors/actuators to operate the system. A system and method may further include a tether management and passthrough system facilitating operation of a tethered UAV while enclosing a UAV storage container to protect internal components during flight. The tether management and passthrough system may include a logic device configured to control one or more motors to position the tether management and passthrough system between a storage position inside the storage container and an operational position allowing the tether to passthrough one or more closed doors of the storage container.

FIG. 1A illustrates a block diagram of a system 100 including a UAV 106 and a landing platform 108 in accordance with one or more embodiments of the present disclosure. In various embodiments, UAV 106 may be configured to fly over a scene or survey area, to fly through a structure, or to approach a target and image or sense the scene, structure, or target, or portions thereof, such using a gimbal system 112 to aim an imaging system/sensor payload 114 at the scene, structure, or target, or portions thereof, for example. Resulting imagery and/or other sensor data may be processed and displayed to a user through use of a user interface 118 (e.g., one or more displays such as a multifunction display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of UAV 106 and/or sensor payload 114, such as controlling the gimbal system 112 to aim sensor payload 114 towards a particular direction, and/or controlling a propulsion system 124 to move UAV 106 to a desired position in a scene or structure or relative to a target. In some cases, the imagery and/or sensor data may be used to land UAV 106 at a target location or align UAV 106 to interact with the target location, which may be on landing platform 108.

UAV 106 may be implemented as a mobile platform configured to move or fly and position and/or aim the sensor payload 114 (e.g., relative to a designated or detected target). As shown in FIG. 1A, UAV 106 may include one or more of a logic device 126, an orientation sensor 128, a gyroscope/accelerometer 132, a global navigation satellite system (GNSS) 134, a communication system 136, gimbal system 112, propulsion system 124, and other modules 140. Operation of UAV 106 may be substantially autonomous and/or partially or completely controlled by a base station 146, which may include one or more of the following: user interface 118, a communications module 148, a logic device 150, and other modules 152. In other embodiments, UAV 106 may include one or more of the elements of base station 146, such as with various types of manned aircraft, terrestrial vehicles, and/or surface or subsurface watercraft. The sensor payload 114 may be physically coupled to UAV 106 and be configured to capture sensor data (e.g., visible spectrum images, infrared images, narrow aperture radar data, and/or other sensor data) of a target position, area, and/or object(s) as selected and/or framed by operation of UAV 106 and/or base station 146. In some embodiments, one or more of the elements of system 100 may be implemented in a combined housing or structure that can be coupled to or within UAV 106, a vehicle, and/or held or carried by a user of system 100.

Logic device 126 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 106 and/or other elements of system 100, such as the gimbal system 112, for example. Such software instructions may also implement methods for processing infrared images and/or other sensor signals, determining sensor information, providing user feedback (e.g., through the user interface 118), querying devices for operational parameters, selecting operational parameters for devices, or performing any of the various operations described herein (e.g., operations performed by logic devices of various elements of system 100).

In addition, a non-transitory medium may be provided for storing machine readable instructions for loading into and execution by logic device 126. In these and other embodiments, logic device 126 may be implemented with other components where appropriate, such as volatile memory, non-volatile memory, one or more interfaces, and/or various analog and/or digital components for interfacing with devices of system 100. For example, logic device 126 may be adapted to store sensor signals, sensor information, parameters for coordinate frame transformations, calibration parameters, sets of calibration points, and/or other operational parameters, over time, for example, and provide such stored data to a user using the user interface 118. In some embodiments, logic device 126 may be integrated with one or more other elements of UAV 106, for example, or distributed as multiple logic devices within UAV 106, base station 146, and/or sensor payload 114.

In some embodiments, logic device 126 may be configured to substantially continuously monitor and/or store the status of and/or sensor data provided by one or more elements of UAV 106, sensor payload 114, and/or base station 146, such as the position and/or orientation of UAV 106, sensor payload 114, and/or base station 146, for example. In various embodiments, sensor data may be monitored and/or stored by logic device 126 and/or processed or transmitted between elements of system 100 substantially continuously throughout operation of system 100, where such data includes various types of sensor data (e.g., for blinking pattern detection), control parameters, and/or other data.

The orientation sensor 128 may be implemented as one or more of a compass, float, accelerometer, and/or other device capable of measuring an orientation of UAV 106 (e.g., magnitude and direction of roll, pitch, and/or yaw, relative to one or more reference orientations such as gravity and/or Magnetic North), gimbal system 112, imaging system/sensor payload 114, and/or other elements of system 100, and providing such measurements as sensor signals and/or data that may be communicated to various devices of system 100. In some cases, a yaw and/or position of UAV 106 may be adjusted to better position/orient UAV 106 to align with a target location based on a fiduciary marker associated with the target location. The gyroscope/accelerometer 132 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of UAV 106 and/or other elements of system 100 and providing such measurements as sensor signals and/or data that may be communicated to other devices of system 100 (e.g., user interface 118, logic device 126, logic device 150). The GNSS 134 may be implemented according to any global navigation satellite system, including a GPS, GLONASS, and/or Galileo based receiver and/or other device capable of determining absolute and/or relative position of UAV 106 (e.g., or an element of UAV 106) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100. In some embodiments, the GNSS 134 may include an altimeter, for example, or may be used to provide an absolute altitude.

The communication system 136 may be implemented as any wired and/or wireless communications module configured to transmit and receive analog and/or digital signals between elements of system 100. For example, the communication system 136 may be configured to receive flight control signals and/or data from base station 146 and provide them to logic device 126 and/or propulsion system 124. In other embodiments, the communication system 136 may be configured to receive images and/or other sensor information (e.g., visible spectrum and/or infrared still images or video images) from the sensor payload 114 and relay the sensor data to logic device 126 and/or base station 146. In some embodiments, the communication system 136 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by the communication system 136 may be configured to transmit data between elements of system 100 substantially continuously throughout operation of system 100, where such data includes various types of sensor data, control parameters, and/or other data.

The gimbal system 112 may be implemented as an actuated gimbal mount, for example, that may be controlled by logic device 126 to stabilize the sensor payload 114 relative to a target (e.g., a target location) or to aim the sensor payload 114 or components coupled thereto according to a desired direction and/or relative orientation or position. As such, the gimbal system 112 may be configured to provide a relative orientation of the sensor payload 114 (e.g., relative to an orientation of UAV 106) to logic device 126 and/or communication system 136 (e.g., gimbal system 112 may include its own orientation sensor 128). In other embodiments, the gimbal system 112 may be implemented as a gravity driven mount (e.g., non-actuated). In various embodiments, the gimbal system 112 may be configured to provide power, support wired communications, and/or otherwise facilitate operation of articulated the sensor/sensor payload 114. In further embodiments, the gimbal system 112 may be configured to couple to a laser pointer, range finder, and/or other device, for example, to support, stabilize, power, and/or aim multiple devices (e.g., the sensor payload 114 and one or more other devices) substantially simultaneously.

In some embodiments, the gimbal system 112 may be adapted to rotate the sensor payload 114±90 degrees, or up to 360 degrees, in a vertical plane relative to an orientation and/or position of UAV 106. In further embodiments, the gimbal system 112 may rotate the sensor payload 114 to be parallel to a longitudinal axis or a lateral axis of UAV 106 as UAV 106 yaws, which may provide 360 degree ranging and/or imaging in a horizontal plane relative to UAV 106. In various embodiments, logic device 126 may be configured to monitor an orientation of gimbal system 112 and/or sensor payload 114 relative to UAV 106, for example, or an absolute or relative orientation of an element of sensor payload 114. Such orientation data may be transmitted to other elements of system 100 for monitoring, storage, or further processing, as described herein.

The propulsion system 124 may be implemented as one or more propellers, rotors, turbines, or other thrust-based propulsion systems, and/or other types of propulsion systems that can be used to provide motive force and/or lift to UAV 106 and/or to steer UAV 106. In some embodiments, the propulsion system 124 may include multiple propellers (e.g., a tri, quad, hex, oct, or other type "copter") that can be controlled (e.g., by logic device 126 and/or the logic device 150) to provide lift and motion for UAV 106 and to provide an orientation for UAV 106. In other embodiments, the propulsion system 124 may be configured primarily to provide thrust while other structures of UAV 106 provide lift, such as in a fixed wing embodiment (e.g., where wings provide the lift) and/or an aerostat embodiment (e.g., balloons, airships, hybrid aerostats). In various embodiments, the propulsion system 124 may be implemented with a portable power supply, such as a battery and/or a combustion engine/generator and fuel supply.

Other modules 140 may include other and/or additional sensors, actuators, communications modules/nodes, and/or user interface devices, for example, and may be used to provide additional environmental information related to operation of UAV 106, for example. In some embodiments, other modules 140 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., logic device 126) to provide operational control of UAV 106 and/or system 100.

In some embodiments, other modules 140 may include one or more actuated and/or articulated devices (e.g., light emitting devices (e.g., light emitting diodes), multi-spectrum active illuminators, visible and/or IR cameras, radars, sonars, and/or other actuated devices) coupled to UAV 106, where each actuated device includes one or more actuators adapted to adjust an orientation of the device, relative to UAV 106, in response to one or more control signals (e.g., provided by logic device 126). In particular, other modules 140 may include a stereo vision system configured to provide image data that may be used to calculate or estimate a position of UAV 106, for example, or to calculate or estimate a relative position of a navigational hazard in proximity to UAV 106. In various embodiments, logic device 126 may be configured to use such proximity and/or position information to help safely pilot UAV 106 and/or monitor communication link quality, as described herein.

The user interface 118 of base station 146 may be implemented as one or more of a display, a touch screen, a keyboard, a mouse, a joystick, a knob, a steering wheel, a yoke, and/or any other device capable of accepting user input and/or providing feedback to a user. In various embodiments, the user interface 118 may be adapted to provide user input (e.g., as a type of signal and/or sensor information transmitted by the communication system 148 of base station 146) to other devices of system 100, such as the logic device 126. The user interface 118 may also be implemented with logic device 150 (e.g., similar to logic device 126), which may be adapted to store and/or execute instructions, such as software instructions, implementing any of the various processes and/or methods described herein. For example, the user interface 118 may be adapted to form communication links and transmit and/or receive communications (e.g., infrared images and/or other sensor signals, control signals, sensor information, user input, and/or other information), for example, or to perform various other processes and/or methods described herein (e.g., via logic device 150).

In one embodiment, the user interface 118 may be adapted to display a time series of various sensor information and/or other parameters as part of or overlaid on a graph or map, which may be referenced to a position and/or orientation of UAV 106 and/or other elements of system 100. For example, the user interface 118 may be adapted to display a time series of positions, headings, and/or orientations of UAV 106 and/or other elements of system 100 overlaid on a geographical map, which may include one or more graphs indicating a corresponding time series of actuator control signals, sensor information, and/or other sensor and/or control signals.

In some embodiments, the user interface 118 may be adapted to accept user input including a user-defined target heading, waypoint, route, and/or orientation for an element of system 100, for example, and to generate control signals to cause UAV 106 to move according to the target heading, route, and/or orientation, or to aim the sensor payload 114 accordingly. In other embodiments, the user interface 118 may be adapted to accept user input modifying a control loop parameter of logic device 126, for example. In further embodiments, the user interface 118 may be adapted to accept user input including a user-defined target attitude, orientation, and/or position for an actuated or articulated device (e.g., the sensor payload 114) associated with UAV 106, for example, and to generate control signals for adjusting an orientation and/or position of the actuated device according to the target altitude, orientation, and/or position. Such control signals may be transmitted to logic device 126 (e.g., using the communication system 148 and 136), which may then control UAV 106 accordingly.

The communication system 148 may be implemented as any wired and/or wireless communications module configured to transmit and receive analog and/or digital signals between elements of system 100. For example, the communication system 148 may be configured to transmit flight control signals from the user interface 118 to communication system 136 or 164. In other embodiments, the communication system 148 may be configured to receive sensor data (e.g., visible spectrum and/or infrared still images or video images, or other sensor data) from the sensor payload 114. In some embodiments, the communication system 148 may be configured to support spread spectrum transmissions, for example, and/or multiple simultaneous communications channels between elements of system 100. In various embodiments, the communication system 148 may be configured to monitor the status of a communication link established between base station 146, the sensor payload 114, and/or UAV 106 (e.g., including packet loss of transmitted and received data between elements of system 100, such as with digital communication links), as described herein. Such status information may be provided to the user interface 118, for example, or transmitted to other elements of system 100 for monitoring, storage, or further processing.

Other modules 152 of base station 146 may include other and/or additional sensors, actuators, communications modules/nodes, and/or user interface devices used to provide additional environmental information associated with base station 146, for example. In some embodiments, other modules 152 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., logic device 126) to provide operational control of UAV 106 and/or system 100 or to process sensor data to compensate for environmental conditions, such as an water content in the atmosphere approximately at the same altitude and/or within the same area as UAV 106 and/or base station 146, for example. In some embodiments, other modules 152 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by the user interface 118).

In embodiments where the imaging system/sensor payload 114 is implemented as an imaging device, the imaging system/sensor payload 114 may include an imaging module 160, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, the imaging module 160 may include one or more logic devices (e.g., similar to logic device 126) that can be configured to process imagery captured by detector elements of the imaging module 160 before providing the imagery to a memory 162 or a communication system 164. More generally, the imaging module 160 may be configured to perform any of the operations or methods described herein, at least in part, or in combination with logic device 126 and/or user interface 118.

In some embodiments, the sensor payload 114 may be implemented with a second or additional imaging modules similar to the imaging module 160, for example, that may include detector elements configured to detect other electromagnetic spectrums, such as visible light, ultraviolet, and/or other electromagnetic spectrums or subsets of such spectrums. In various embodiments, such additional imaging modules may be calibrated or registered to the imaging module 160 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

The communication system 164 of the sensor payload 114 may be implemented as any wired and/or wireless communications module configured to transmit and receive analog and/or digital signals between elements of system 100. For example, the communication system 164 may be configured to transmit infrared images from the imaging module 160 to communication system 136 or 148. In other embodiments, the communication system 164 may be configured to receive control signals (e.g., control signals directing capture, focus, selective filtering, and/or other operation of sensor payload 114) from logic device 126 and/or user interface 118. In some embodiments, communication system 164 may be configured to support spread spectrum transmissions, for example, and/or multiple simultaneous communications channels between elements of system 100. In various embodiments, the communication system 164 may be configured to monitor and communicate the status of an orientation of the sensor payload 114 as described herein. Such status information may be provided or transmitted to other elements of system 100 for monitoring, storage, or further processing.

The memory 162 may be implemented as one or more machine readable mediums and/or logic devices configured to store software instructions, sensor signals, control signals, operational parameters, calibration parameters, infrared images, and/or other data facilitating operation of system 100, for example, and provide it to various elements of system 100. The memory 162 may also be implemented, at least in part, as removable memory, such as a secure digital memory card for example including an interface for such memory.

An orientation sensor 170 of the sensor payload 114 may be implemented similar to the orientation sensor 128 or gyroscope/accelerometer 132, and/or any other device capable of measuring an orientation of the sensor payload 114, the imaging module 160, and/or other elements of the sensor payload 114 (e.g., magnitude and direction of roll, pitch, and/or yaw, relative to one or more reference orientations such as gravity, Magnetic North, and/or an orientation of UAV 106) and providing such measurements as sensor signals that may be communicated to various devices of system 100. A gyroscope/accelerometer (e.g., angular motion sensor) 172 of the sensor payload 114 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of the sensor payload 114 and/or various elements of the sensor payload 114 and providing such measurements as sensor signals that may be communicated to various devices of system 100.

Other modules 176 of the sensor payload 114 may include other and/or additional sensors, actuators, communications modules/nodes, cooled or uncooled optical filters, and/or user interface devices used to provide additional environmental information associated with the sensor payload 114, for example. In some embodiments, other modules 176 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by the imaging module 160 or other devices of system 100 (e.g., logic device 126) to provide operational control of UAV 106 and/or system 100 or to process imagery to compensate for environmental conditions.

With continued reference to FIG. 1A, landing platform 108 may include various components to facilitate the operation of landing platform 108, including communications (e.g., with UAV 106 and/or base station 146, etc.), controlling various components and tests, and receiving and processing sensor data. In embodiments, landing platform 108 includes a power supply 180, a controller 182, an input/output (I/O) component 184, communications components 186, platform logic 188, one or more motor drivers 190, and one or more sensors 192, or any combination thereof.

Power supply 180 may be any power supply suitable to power landing platform 108 or components thereof. For instance, power supply 180 may include one or more batteries or other power supply components. In embodiments, landing platform 108 may be plugged into a power outlet or hardwired to a facility's electrical system or to a vehicle's electrical system to charge the batteries and/or power landing platform 108.

Controller 182 may be implemented as one or more microprocessors, microcontrollers, application specific integrated circuits (ASICs), programmable logic devices (PLDs) (e.g., field programmable gate arrays (FPGAs), complex programmable logic devices (CPLDs), field programmable systems on a chip (FPSCs), or other types of programmable devices), or other processing devices used to control the operations of landing platform 108.

I/O component 184 may process user action, such as selecting keys from a keypad/keyboard and/or selecting one or more buttons, images, or links, such as for inputting or accessing/requesting data, and sends a corresponding signal to controller 182. I/O component 184 may also include an output component, such as a display control and a cursor control (such as a keyboard, keypad, mouse, etc.). I/O component 184 may include an optional audio/visual component to allow a user to use voice for inputting information by converting audio signals and/or input or record images/videos by capturing visual data. I/O component 184 may allow the user to hear audio and view images/video.

Communications components 186 may include wired and/or wireless interfaces. Wired interfaces may include communications links with various platform components and may be implemented as one or more physical networks or device connect interfaces (e.g., Ethernet, and/or other protocols). Wireless interfaces may be implemented as one or more Wi-Fi, Bluetooth, cellular, infrared, radio, and/or other types of network interfaces for wireless communications and may facilitate communications with wireless devices of landing platform 108, UAV 106, base station 146, and/or other component or system.

Platform logic 188 may be implemented as circuitry and/or a machine-readable medium storing various machine-readable instructions and data. For example, in some embodiments, platform logic 188 may store an operating system and one or more applications as machine readable instructions that may be read and executed by controller 182 to perform various operations described herein. In some embodiments, platform logic 188 may be implemented as non-volatile memory (e.g., flash memory, hard drive, solid state drive, or other non-transitory machine-readable mediums), volatile memory, or combinations thereof. Platform logic 188 may include status, configuration and control features which may include various control features disclosed herein. In some embodiments, platform logic 188 executes one or more tests or calibrations to be performed on landing platform 108, as described above. Status information of the tests, calibration specific values, and other information may be displayed to the user during production.

The one or more motor drivers 190 may control one or more motors of landing platform 108, such as an actuator or motor to control movement of various components of landing platform 108, as described herein. The one or more sensors 192 may include sensors for detecting calibration values, platform position, etc.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for UAV 106, using one or more power leads. Such power leads may also be used to support one or more communication techniques between elements of system 100.

Figure 1B:
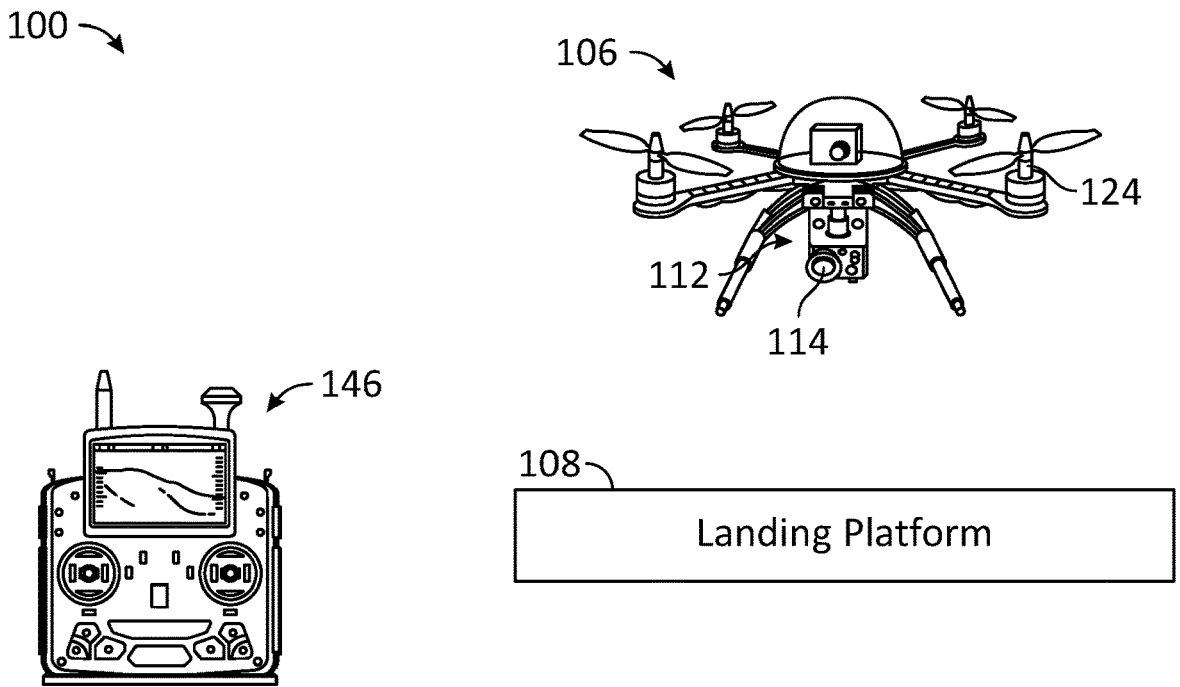
FIG. 1B illustrates a diagram of the system of FIG. 1A, in accordance with one or more embodiments of the present disclosure.

FIG. 1B illustrates a diagram of system 100 in accordance with one or more embodiments of the present disclosure. In some embodiments, base station 146 may be configured to control motion, position, and/or orientation of UAV 106 and/or sensor payloads 114. Further, base station 146 may be configured to control operation of landing platform 108 in some embodiments. In various embodiments, UAV 106 may be configured to control an operation of landing platform 108 such that UAV 106 may automate a landing procedure as discussed herein. Generally, system 100 may include any number of UAVs, landing platforms, and base stations.

Figure 2:
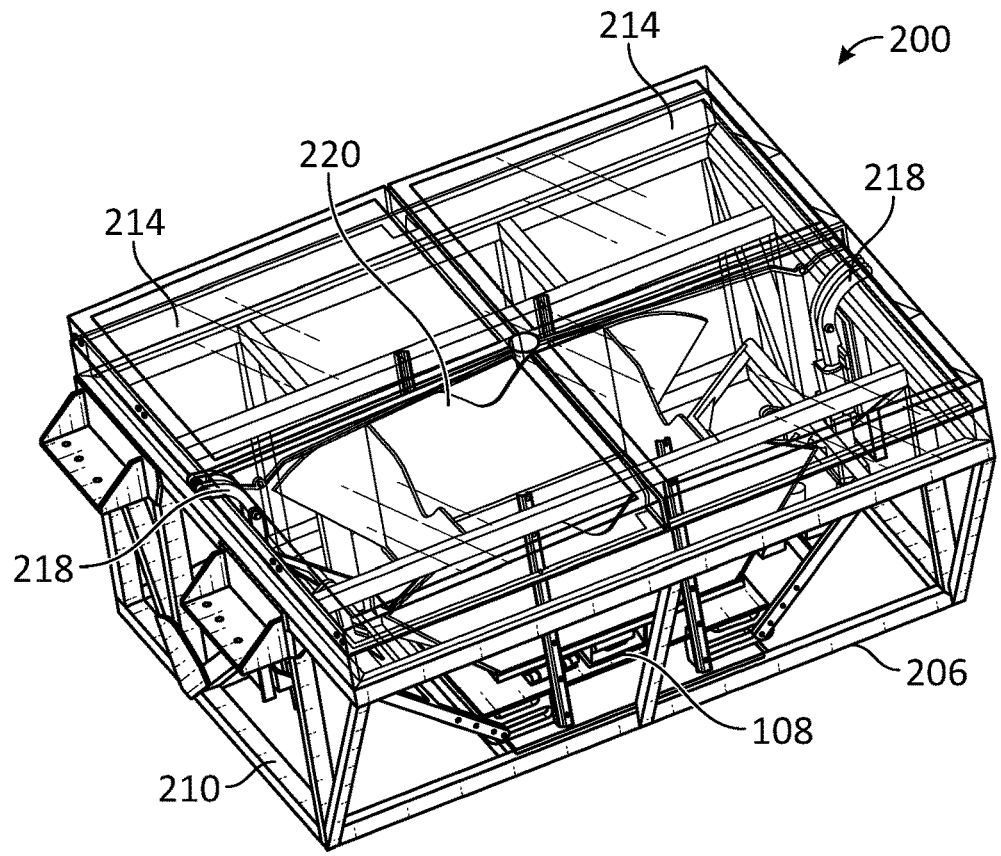
FIG. 2 illustrates a landing platform in a closed configuration, with portions of the platform shown transparent for illustration purposes, in accordance with one or more embodiments of the present disclosure.
Figure 3:
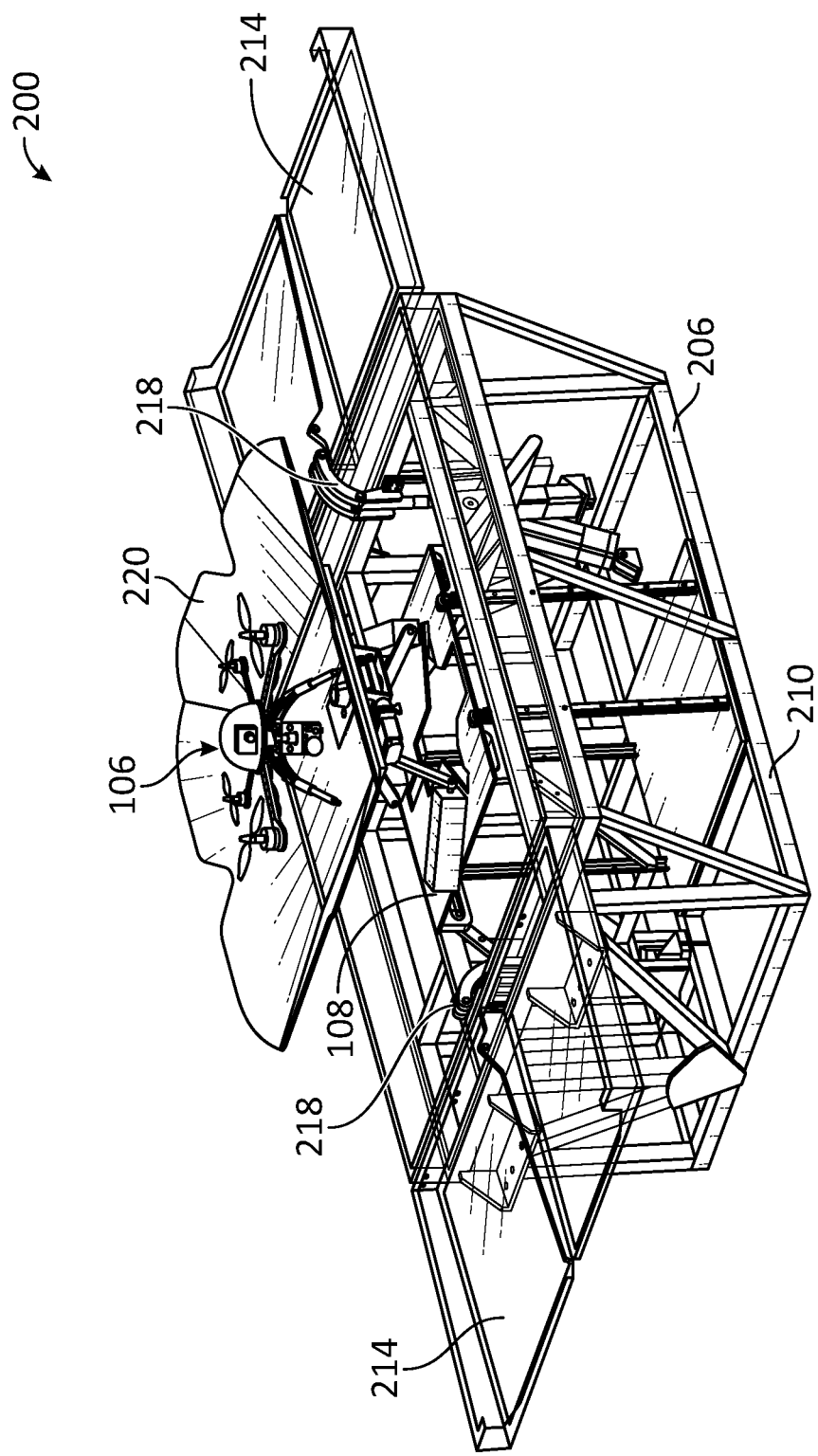
FIG. 3 illustrates the landing platform in an open configuration, with portions of the platform shown transparent for illustration purposes, in accordance with one or more embodiments of the present disclosure.
Figure 4:
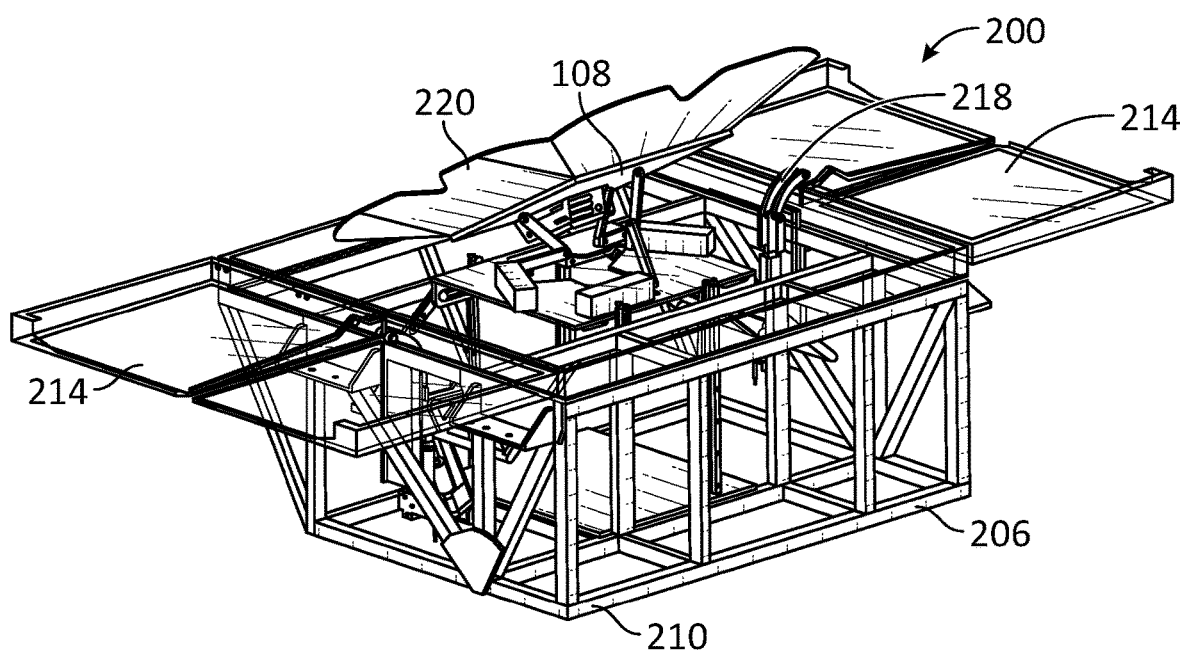
FIG. 4 illustrates the landing platform in the open configuration and angled to compensate for an off-angle orientation of the system, in accordance with one or more embodiments of the present disclosure.

FIG. 2 illustrates a UAV landing/launch system 200 in a closed configuration, with portions of system 200 shown transparent for illustration purposes, in accordance with one or more embodiments of the present disclosure. FIG. 3 illustrates system 200 in an open configuration, with portions of system 200 shown transparent for illustration purposes, in accordance with one or more embodiments of the present disclosure. FIG. 4 illustrates system 200 in the open configuration and adapted to compensate for an off-angle orientation of the system 200, in accordance with one or more embodiments of the present disclosure. Referring to FIGS. 2-4, UAV 106 may be raised and lowered out of a container 206, the container 206 adapted to store UAV 106 between missions and/or protect UAV 106 from the environment. For example, landing platform 108 may be secured within container 206. As detailed more fully below, at least a portion of landing platform 108 may be raisable from container 206 to a launch position via a lift mechanism. As illustrated in FIG. 4, system 200 may allow landing platform 108 to be manipulated at any angle to keep landing platform 108 at a desired orientation, such as at an orientation required for UAV 106 to launch/land. Such embodiments may compensate for off-angle orientations of container 206, such as in embodiments where container 206 is mounted to a vehicle.

As illustrated in FIGS. 2-4, container 206 may include a frame 210 and one or more doors 214. For illustration purposes, doors 214 are illustrated transparent to illustrate other features of system 200. Frame 210 may provide a support structure to mount landing platform 108 within container 206 and/or mount container 206 (e.g., to a vehicle). As illustrated in FIG. 2, the one or more doors 214 may be closed to, for example, secure landing platform 108 in container 206 and/or protect landing platform 108 from the environment. As illustrated in FIGS. 2-3, the one or more doors 214 may be opened to, for example, allow raising of landing platform 108 to a launch position. In embodiments, raising landing platform 108 may cause door(s) 214 to automatically open, such as via an arm 218 securing door(s) 214 to landing platform 108. Lowering landing platform 108 into container 206 may cause door(s) 214 to automatically close, such as via arm 218.

Referring to FIG. 2, landing platform 108 may be configurable to allow platform storage of landing platform 108 within container 206. For example, landing platform 108 may include one or more folding sections or elements 220 allowing landing platform 108 to fold up into a smaller size to be stowed in container 206. Referring to FIGS. 3-4, the folding elements 220 may be unfolded when landing platform 108 is raised from container 206, such as to provide a larger landing platform for UAV 106. In embodiments, folding elements 220 may be adapted to position UAV 106 on landing platform 108. For example, at least a portion of folding elements 220, when in a closed position, may be adapted to trap on a feature of UAV 106 to hold UAV 106 in place.

Folding elements 220 are illustrative only, and any reference to folding or unfolding is for convenience only and should not be construed as a required feature unless otherwise claimed. For example, landing platform 108 may include other configurations, including articulating or moving elements that selectively collapse or close to engage UAV 106 and/or fit landing platform 108 within container 206, and selectively expand or open to facilitate UAV take-off and/or landing. For instance, and without limitation, landing platform 108 may include an articulating stage without any folding features.

FIGS. 5-9 illustrate various views of landing platform 108 with container 206 removed for illustration purposes, in accordance with one or more embodiments of the present disclosure. As shown, landing platform 108 includes a support plate 502 adapted to support UAV 106, folding elements 220 (e.g., adapted to position UAV 106 on support plate 502), and one or more motors 506. Support plate 502 may be a flat plate providing a landing surface for UAV 106. Folding elements 220 may be pivotably coupled to support plate 502 to move between closed and open positions. The closed position of folding elements 220 (see FIGS. 5-6) may secure UAV 106. For example, at least a portion of folding elements 220, when in the closed position, may be adapted to trap on a feature of UAV 106 to hold UAV 106 in place on support plate 502. The open position of folding elements 220 (see FIGS. 7-9) may allow UAV 106 to launch from and/or land on support plate 502. For example, when opened, folding elements 220 may clear UAV 106.

Figure 7:
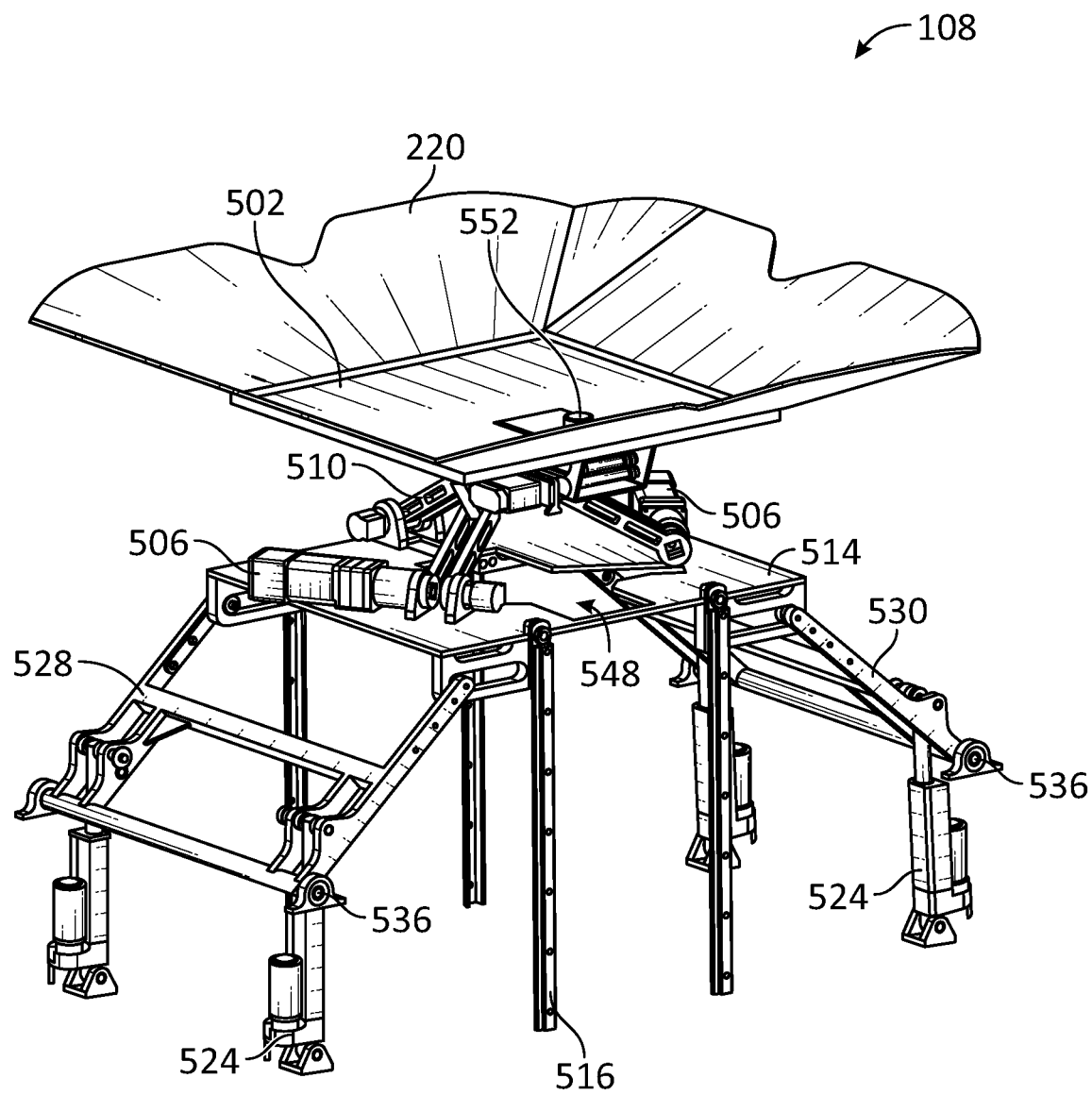
FIG. 7 illustrates the landing platform of FIG. 5 in the launch position and platform sections deployed, in accordance with one or more embodiments of the present disclosure.
Figure 8:
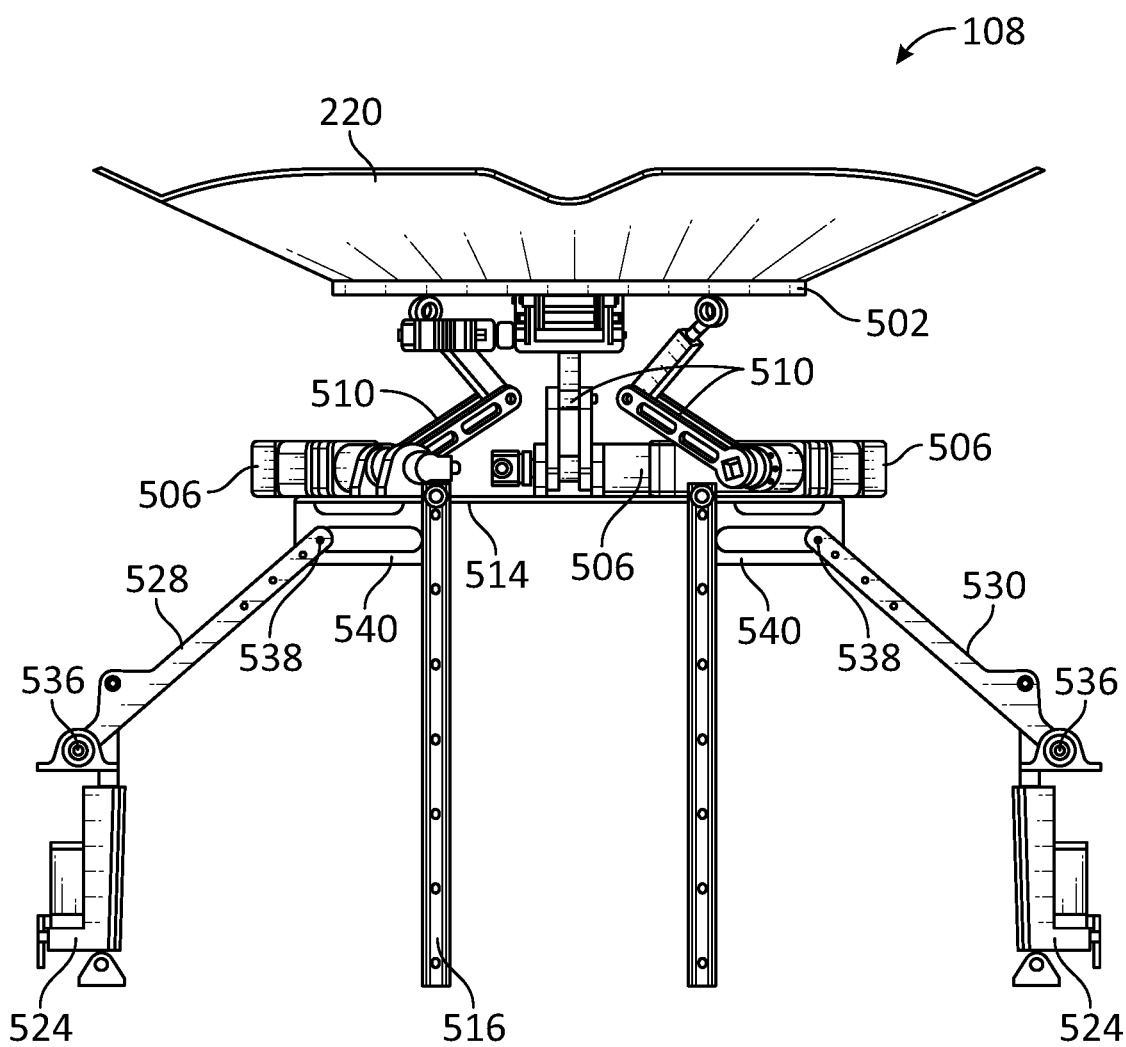
FIG. 8 illustrates a side view of the landing platform of FIG. 7, in accordance with one or more embodiments of the present disclosure.
Figure 9:
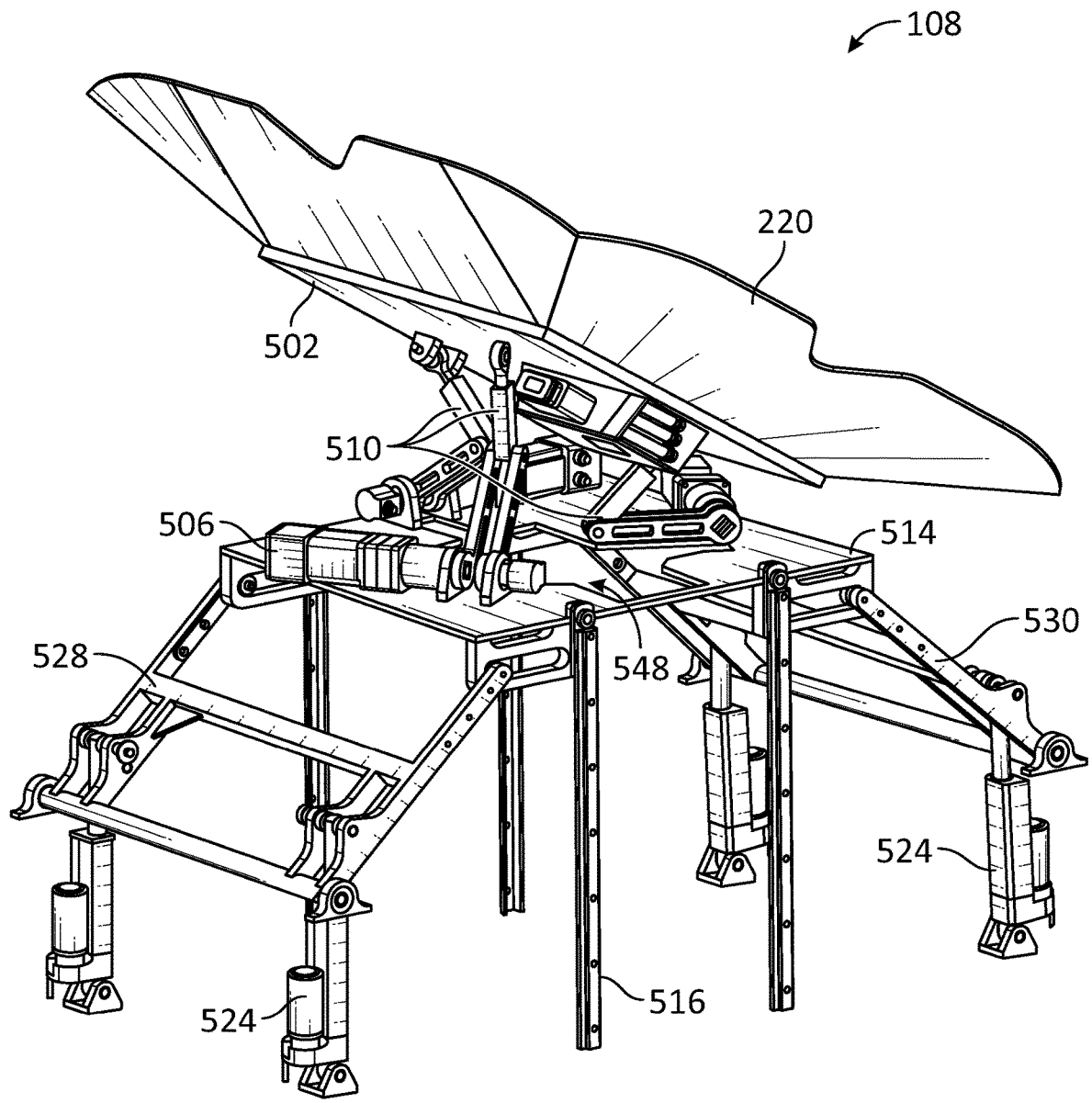
FIG. 9 illustrates the landing platform of FIG. 7 angled to compensate for an off-angle orientation of the system, in accordance with one or more embodiments of the present disclosure.

The one or more motors 506 may be configured to align support plate 502 at a desired orientation. For example, the one or more motors 506 may be configured to align support plate 502 with a horizon based on a detected orientation of support plate 502. For example, motor(s) 506 may align support plate 502 even with the horizon to account for off-angle mounting and/or positioning of container 206/landing platform 108. Such embodiments may allow proper positioning of support plate 502 when an associated vehicle is on uneven or off-angle terrain, for instance. Depending on the application, landing platform 108 may include a plurality of motors 506 (e.g., three motors 506), although other configurations are contemplated. As best illustrated in FIGS. 7-9, an articulating arm assembly 510 may couple each motor of the one or more motors 506 to support plate 502 to facilitate angular positioning of support plate 502 by motors 506.

As illustrated in FIGS. 5-9, landing platform 108 may include a base plate 514. The one or more motors 506 may be mounted to base plate 514 to control a position of support plate 502 relative to base plate 514. As shown, base plate 514 may be slidably coupled to a linear track 516. Linear track 516 may be defined by one or more track elements 518 (e.g., four track elements 518) limiting movement of base plate 514 to along a single axis (e.g., a vertical axis relative to container 206 to raise/lower landing platform 108 in container 206). Base plate 514 may be coupled to linear track 516 by a linear bearing or a carriage bearing. Linear track 516 (e.g., track elements 518) may be mounted to container 206.

In embodiments, landing platform 108 may include one or more actuators 524 configured to slide base plate 514 along linear track 516. For example, one end of each actuator may be secured to container 206 (e.g., to frame 210 via a mounting block) and the opposing, actuating end of each actuator may be coupled to base plate 514 (either directly or via one or more elements). In embodiments, a first lift arm 528 may couple a first set of actuators (e.g., a first pair of actuators 524) to base plate 514, and a second lift arm 530 may couple a second set of actuators (e.g., a second pair of actuators 524) to base plate 514. A first end 534 of each of first lift arm 528 and second lift arm 530 may be secured to container 206 (e.g., to frame 210 via a mount 536) and an opposing second end 538 of first lift arm 528 and second lift arm 530 may be coupled to base plate 514 (e.g., via a carriage 540). Each actuator 524 may be a linear actuator, although other configurations are contemplated.

Landing platform 108 may include other features. For example, landing platform 108 may include a tether system 550 including a tether guide 552. Tether system 550 may facilitate tethered flight of UAV 106, with tether guide 552 facilitating extension/retraction of a tether connected to UAV 106. In embodiments, landing platform 108 may include one or more sensors configured to detect an orientation of support plate 502 (e.g., relative to the horizon). In embodiments, landing platform 108 may include a control system (e.g., controller 182) configured to control operation of landing platform 108. For example, controller 182 may detect the orientation of support plate 502 and control the one or more motors 506 to align support plate 502 (e.g., with the horizon) based on the detected orientation of support plate 502.

Figure 5:
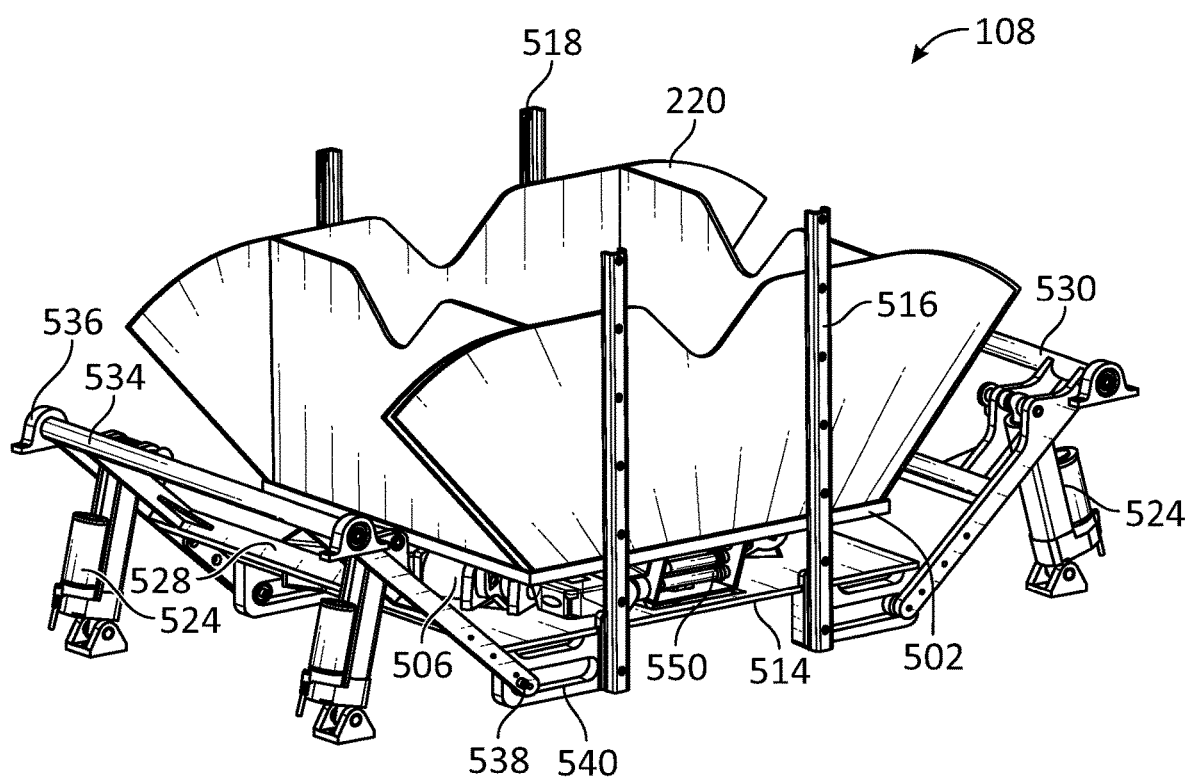
FIG. 5 illustrates the landing platform in a stowed position, with portions of the platform removed for illustration purposes, in accordance with one or more embodiments of the present disclosure.

With continued reference to FIGS. 5-9, operation of landing platform 108 will now be discussed. As disclosed herein, landing platform 108 may be secured within container 206 and movable between a stowed position and a launch position via a lift mechanism. FIG. 5 illustrates landing platform 108 in the stowed position, in accordance with one or more embodiments of the present disclosure. As illustrated, actuators 524 may be collapsed such that base plate 514 is in a lowered position (e.g., a lowermost vertical position within container 206). For example, first lift arm 528 and second lift arm 530 may be positioned via retraction or collapsing of actuators 524 to lower second end 538 of first lift arm 528 and second lift arm 530 adjacent a bottom of container 206. Actuators 524 may be collapsed or retracted evenly to maintain a level position of base plate 514, such as parallel to the bottom of container 206 and/or perpendicular to linear track 516 to limit binding. Motors 506 may be actuated to collapse support plate 502 to a lowered position (e.g., a lowermost position near base plate 514). For example, motors 506 may be actuated to collapse (e.g., fully collapse) each articulating arm assembly 510. In embodiments, base plate 514 may include one or more cutouts 548 to accommodate articulating arm assemblies 510 in the lowermost position. Support plate 502 may extend parallel to base plate 514 in the stowed position. As shown, folding elements 220 may be folded or otherwise collapsed to allow positioning of landing platform 108 in container 206. Folding or collapsing of folding elements 220 may secure UAV 106 to landing platform 108, such as a portion of folding elements 220 trapping or engaging a portion of UAV 106.

Figure 6:
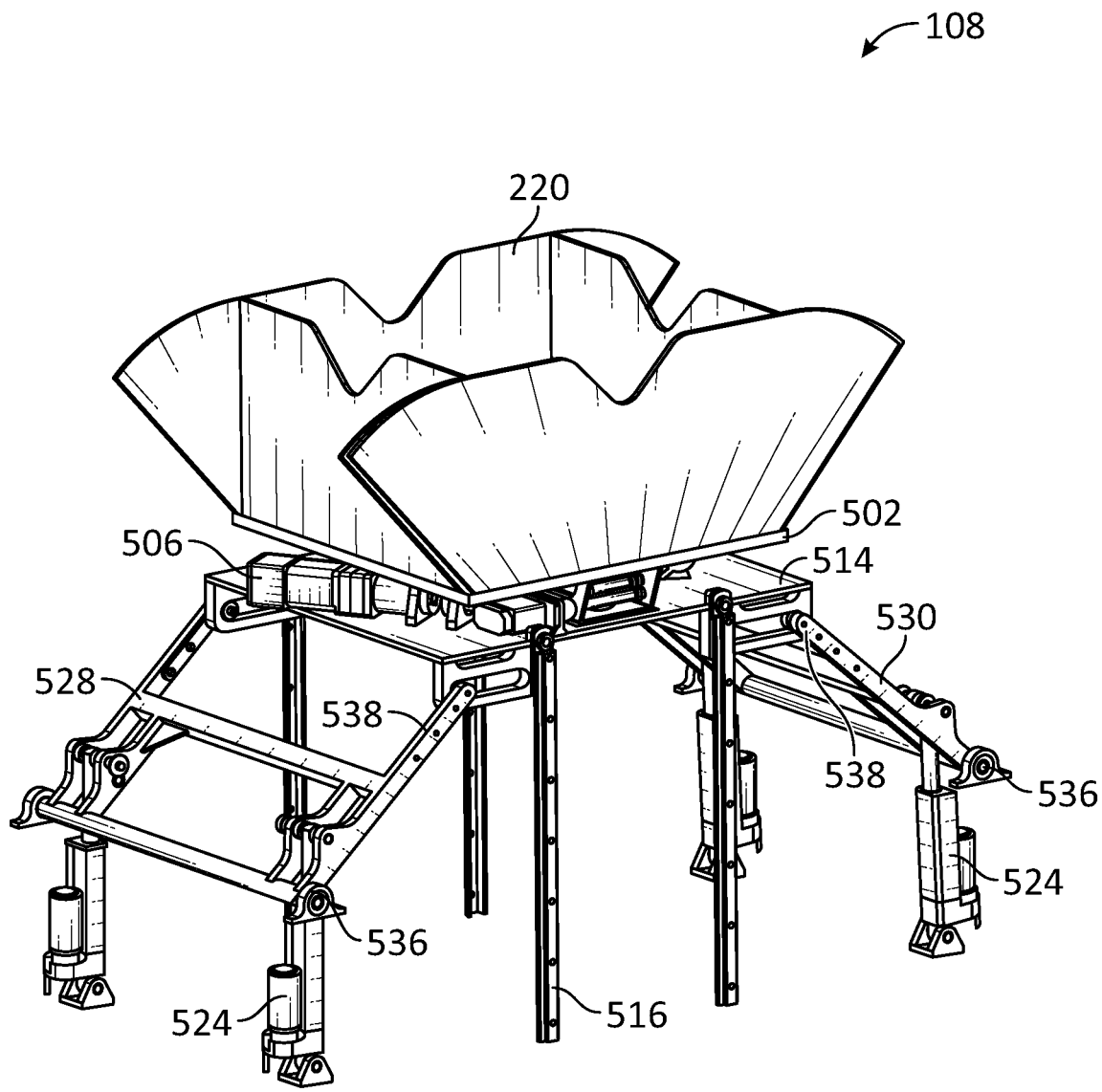
FIG. 6 illustrates the landing platform of FIG. 5 raised to a launch position, in accordance with one or more embodiments of the present disclosure.

FIG. 6 illustrates landing platform 108 raised to the launch position with folding elements 220 collapsed/folded, in accordance with one or more embodiments of the present disclosure. As illustrated, actuators 524 may be extended to raise base plate 514 to a raised position (e.g., an uppermost vertical position within container 206). For example, first lift arm 528 and second lift arm 530 may be positioned via extension of actuators 524 to raise second end 538 of first lift arm 528 and second lift arm 530 (e.g., via rotation of first lift arm 528 and second lift arm 530 about mount 536). Actuators 524 may be extended evenly to maintain level position of base plate 514 (e.g., to limit binding of base plate 514 along linear track 516). Raising base plate 514 via actuators 524 may cause base plate 514 to slide along linear track 516 and second end 538 of first lift arm 528/second lift arm 530 to slide along carriage 540.

FIGS. 7-8 illustrate landing platform 108 raised to the launch position with folding elements 220 deployed/unfolded, in accordance with one or more embodiments of the present disclosure. As illustrated, movement of landing platform 108 from the stowed position to the launch position may deploy folding elements 220 from the closed position to the open position. Similarly, movement of landing platform 108 from the launch position to the stowed position may collapse the folding elements 220 from the open position to the closed position. For instance, motors 506 may be actuated to raise support plate 502 away from base plate 514 (e.g., to a raised position). In embodiments, motors 506 may be actuated to articulate one or more articulating arm assemblies 510 to cause movement of support plate 502 relative to base plate 514. As shown, motors 506 may be actuated evenly to raise support plate 502 parallel to base plate 514. Raising of base plate 514 and/or raising of support plate 502 relative to base plate 514 may deploy folding elements 220, such as automatically, as folding elements 220 clear container 206/doors 214. Conversely, lowering of base plate 514 and/or lowering of support plate 502 towards base plate 514 may collapse folding elements 220, such as automatically.

FIG. 9 illustrates landing platform 108 raised to the launch position, folding elements 220 deployed, and support plate 502 angled relative to base plate 514, in accordance with one or more embodiments of the present disclosure. As illustrated, motors 506 may be actuated unevenly to position support plate 502 at a non-parallel angle to base plate 514. In this manner, support plate 502 may be manipulated to substantially any mechanically-allowable angle to position support plate 502 at a desired orientation. Such embodiments may be useful to compensate for off-angle orientations of container 206/landing platform 108. For example, mounting container 206 on a vehicle may cause container 206 to be positioned off-angle relative to the horizon, such as due to the mounting itself or positioning of vehicle on uneven or off-angle terrain. In such embodiments, support plate 502 may be angled relative to base plate 514 via motors 506 and articulating arm assemblies 510 to maintain a level or near-level alignment of support plate 502 with the horizon.

Lowering landing platform 108 from the launch position to the stowed position may be accomplished via a reverse order of operations. For example, motors 506 may be actuated to collapse support plate 502 to base plate 514, and actuators 524 may be actuated to lower base plate 514 along linear track 516 and into container 206. Collapsing support plate 502 to base plate 514 and/or lowering of base plate 514 into container 206 may collapse folding elements 220, such as automatically as folding elements 220 engage container 206/doors 214. As noted above, lowering of landing platform 108 into container 206 may cause doors 214 to close, such as via arm 218. Alternatively, one or more actuators/motors may open or close doors 214 based on position of landing platform 108 and/or an executable control.

Figure 10:
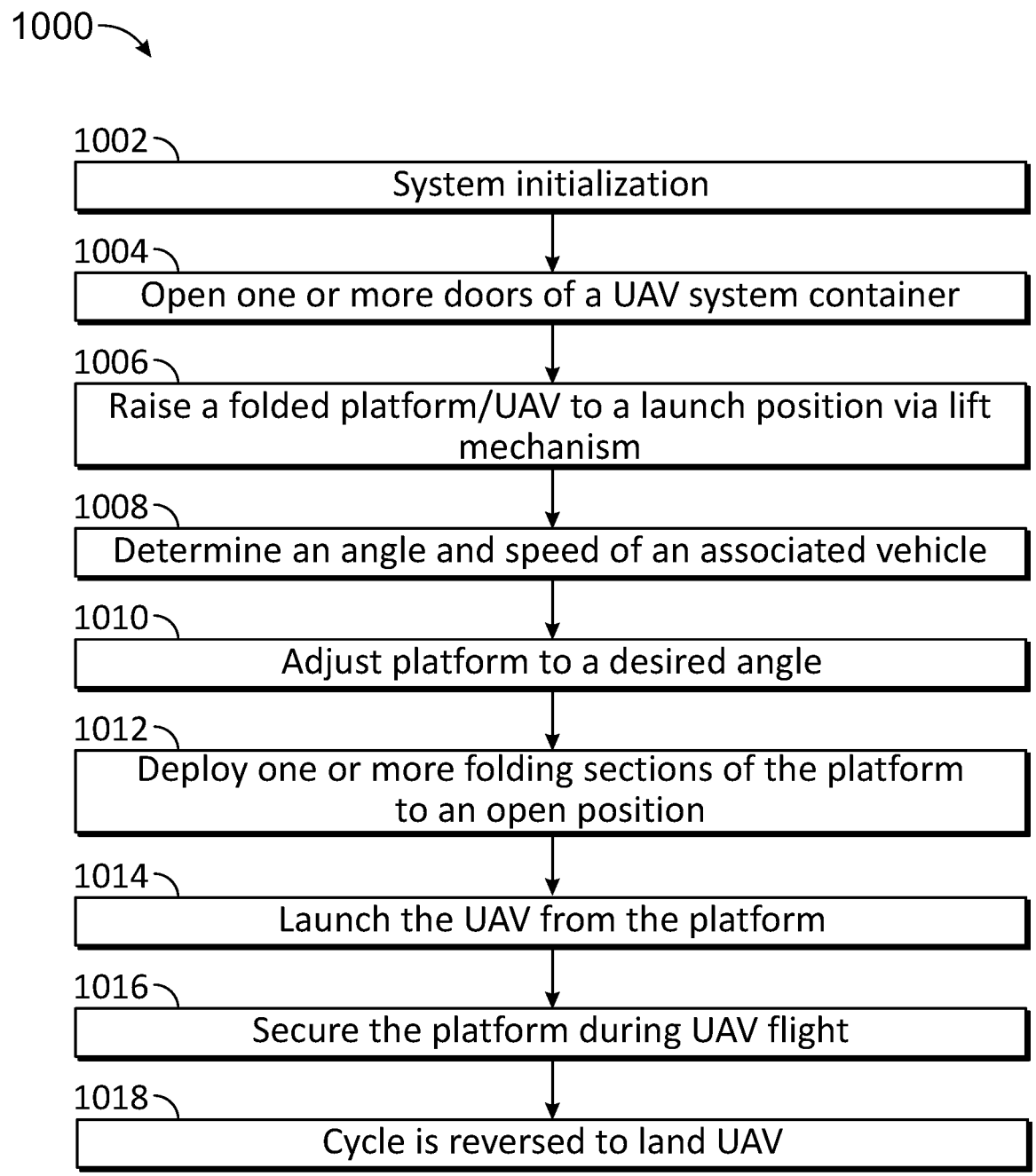
FIG. 10 illustrates a flow diagram of a process for positioning a UAV landing platform, in accordance with one or more embodiments of the present disclosure.

FIG. 10 illustrates a flow diagram of a process 1000 for positioning a UAV landing platform, in accordance with one or more embodiments of the present disclosure. For explanatory purposes, process 1000 is described with reference to FIGS. 1-9. Note that one or more operations in FIG. 10 may be combined, omitted, and/or performed in a different order as desired. According to various embodiments, process 1000 may be performed by a logic device, such as logic device 126 of UAV 106, controller 182 of landing platform 108, the logic device 150 for base station 146, or a combination of the aforementioned logic devices, which may be communicatively coupled to execute the operations of process 1000.

In block 1002, process 1000 includes system initialization. For example, one or more sensors, controls, or modules of a UAV system may be initialized for operation. Data may be received from various elements of the UAV system to determine a status of the UAV system, or subsystems thereof. In embodiments, one or more systems of UAV system may be reset. A notification may be generated for the user, such as to provide an indication of the status of UAV system, among other notifications.

In block 1004, process 1000 includes opening one or more doors of a container of the UAV system. The container may house a platform for a UAV. Opening the doors of the container may allow raising of the platform to a launch position, as detailed above.

In block 1006, process 1000 includes raising a folded platform to a launch position via a lift mechanism. For example, once doors are opened sufficiently, the folded platform/UAV may be raised via one or more linear actuators, such as in a manner as described above.

In block 1008, process 1000 includes determining an angle and a speed of an associated vehicle. For example, an angle and speed of the vehicle relative to the horizon may be determined, such as via one or more sensors of the vehicle, UAV system, or other devices.

In block 1010, process 1000 includes adjusting the platform to a desired angle. For instance, the platform may be adjusted level with the horizon via one or more electric motors and/or other devices (e.g., articulating arm assemblies). In embodiments, the platform may be angled to account for an angle of attack of the UAV needed for takeoff.

In block 1012, process 1000 includes deploying one or more folding sections of the platform to an open position. For example, folding elements may be pivotally coupled along edges of platform. The folding elements may deploy, such as automatically, as the elements clear the container or doors. In embodiments, a portion of the folding elements may catch against the container/doors to deploy the folding elements as the platform is raised. In embodiments, one or more associated actuators or motors may deploy the folding elements based on the position of the platform, such as once the platform is raised the folding elements are deployed.

In block 1014, process 1000 includes launching the UAV from the platform. For instance, the UAV positioned on the platform may take off, and once airborne, the UAV may perform various flight maneuvers, as detailed above.

In block 1016, process 1000 includes securing the platform (e.g., in the container) during UAV flight. For example, the platform can be collapsed (e.g., folding the folding elements to a closed position) and lowered to a stowed position (e.g., in the container). In embodiments, block 1016 may include closing the doors of the container. Lowering the platform into the container may fold the folding elements, such as a portion of the folding elements catching against the container/doors to collapse the folding elements. In embodiments, one or more associated actuators or motors may collapse the folding elements as or prior to the platform being lowered into the container.

In block 1018, process 1000 includes reversing the cycle to land UAV on the platform. For example, the platform may be raised from the container, the folding elements deployed, and the platform angularly adjusted to present a landing surface/platform for the UAV. In embodiments, the platform may be angled to account for the angle of attack of the UAV during landing. Once the UAV has landed on the platform, the platform can be folded up and lowered into the container. Once the platform is lowered into the container, the doors can be closed, and the system powered down or placed in a standby mode. Closing the doors of the container may secure the stored platform/UAV in the container.

After a UAV lands on the platform, it may come to rest in various positions and orientations relative to the center of the support plate and/or relative to a desired storage position. For example, the UAV may be equipped with four legs adapted to support the UAV on a rectangular support plate. A desired landing position may include all four legs on the support plate, with each leg at or adjacent to a different corner of the support plate. If one or more legs come to rest on the folding elements, the UAV may be out of position. If one or more legs is not at or adjacent to a corner of the support plate, the orientation of the UAV may be off.

In embodiments, the position and orientation of the UAV on the support plate may be adjusted by the folding elements, which are adapted to fold/collapse around the perimeter of the support plate and the UAV. In some embodiments, the folding elements may be biased to the unfolded/deployed position (e.g., via a hinged spring or other bias member) when the support platform is in a raised position. The folding elements may be pushed into the folded/collapsed position through contact with a frame of the container, or other component/structure disposed therein, as the support plate is lowered into the container. As the folding elements are pushed into the folded/collapsed position, contact between the UAV and one or more of the folding elements may push the UAV towards the center of support plate, trapping the UAV therein in a desired position and orientation. In this example, the position and orientation of the UAV is passively adjusted by the folding elements as the support platform is lowered into the container.

It may be desirable in some systems to actively adjust the position and orientation of the UAV on the support platform. An adjustment mechanism may be adapted to move one or more folding elements between a folded and unfolded position in response to commands received from a controller or logic device (e.g., controller 182, logic device 150, or another processing component). In some embodiments, the adjustment mechanism includes a motor and a linkage assembly adapted to translate motion generated by the motor into movement of the folding element. In various embodiments, the adjustment mechanism may include a pneumatic cylinder, a linear actuator, and/or other components adapted to generate movement or force to facilitate movement of folding elements as described herein. The adjustment mechanism may further include one or more rods, tracks, arms, linking members, pivoting members, connectors, and/or other components to connect the motor to the folding element to facilitate movement of the folding elements as described herein. In some embodiments, a method for positioning or aligning the UAV on a landing surface or platform includes control logic instructing one or more adjustment mechanisms to fold/unfold one or more of the folding elements to reposition/orient the UAV.

The folding elements may be adapted to assist with positioning and orienting the UAV on the landing platform under control of the logic device. The folding elements may be made of material(s) that are relatively strong, stiff, and light, such as aluminum, composite sheet material, or other material suitable for use as a landing platform and folding elements to position and orient a UAV as described herein. In some embodiments, each folding element is pivotably connected to the support plate, at or adjacent to the perimeter of the landing area. The folding elements may also be pivotably connected to adjacent folding elements in an interconnected arrangement creating an expanded landing platform and facilitating folding of the folding elements into a compact structure for positioning inside the container. The UAV may have a support structure such as multiple legs, skids, a ring attached to the legs, a structural base, or other features designed to support the UAV on the support plate and interact with the folding elements of the landing platform. In some embodiments, the UAV and support plate are designed such that UAV support structure extends to or adjacent to the perimeter of the support structure.

The systems and methods disclosed herein may be configured with a tether system (e.g., tether system 550 with tether guide 552 as described with respect to FIGS. 5 and 7) facilitating tethered flight of the UAV. In some embodiments, the tether guide is attached inside the storage container, such as on the surface of the landing platform. During flight, the UAV is tethered to the launch/land system through the tether guide, providing power to and/or communications with the UAV during operation. In some embodiments, the doors of the container remain open during tethered UAV flight to maintain an unobstructed path between the UAV and the tether guide. In some embodiments, it is desirable to close the doors during flight to protect the container's internal components (e.g., electronics, motors, moving parts) from environmental conditions. However, closing the doors on the tether will impede extension and retraction of the tether during flight and cause wear and tear on the tether and launch/land system. In accordance with various embodiments, a tether passthrough system is described herein that enables tethered flight from a launch/land system, while the doors of the launch/land system are closed.

Figure 11:
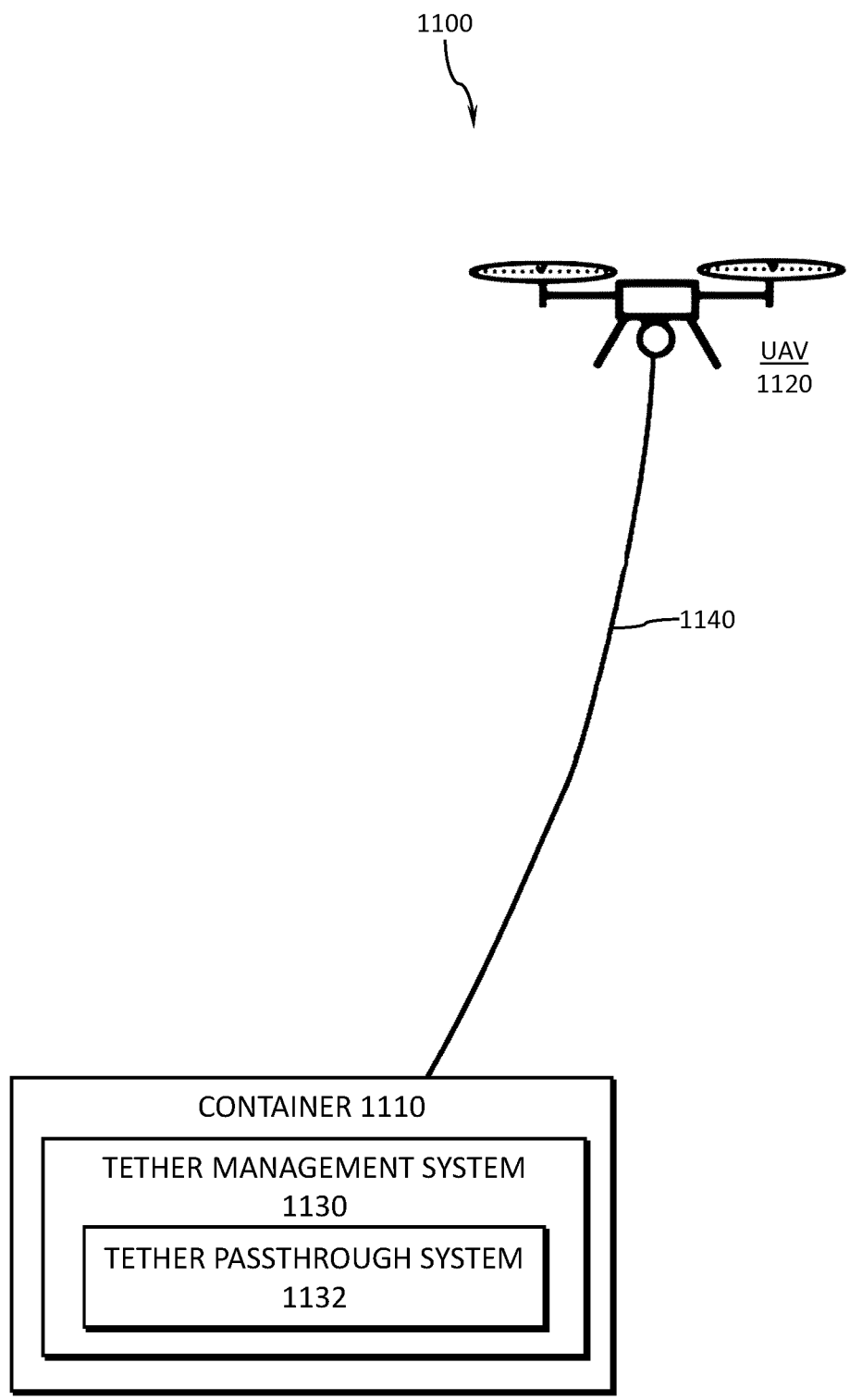
FIG. 11 illustrates an example tethered UAV system, in accordance with one or more embodiments of the present disclosure.

Referring to FIG. 11, an example system 1100 including a container 1110 for storing and launching a tethered UAV 1120 will now be described in accordance with one or more embodiments. In some embodiments, a system incorporating a tethered UAV may be referred to as a Persistent Aerial Reconnaissance and Communication (PARC) System that offers extended flight time for the UAV through the use of a microfilament tether, which may be implemented by thread-like wire(s) that can transmit over a kilowatt of power to the UAV while also enabling transmission of bi-directional control and or sensor data, including high-definition video. A PARC system may be rapidly deployed as a low-maintenance UAV that allows cameras, radios, or other payloads to remain in operation for long durations. A PARC system may be designed to be intuitively simple to launch/land, and a small logistics footprint may make the system appropriate for rough environments. A PARC system may require minimal training for operations and maintenance. A PARC system may be designed for quick and simplified deployment to minimize operator management while maximizing capability provided in terms of communications extension, force protection, persistent stare, and tactical intelligence.

As illustrated, the system 1100 includes a tethered UAV 1120 equipped with a payload, a launch box container 1110 including a tether management system 1130, and a tether 1140. Payload 140 may include a camera, radar, or other type of surveillance, communication, or other sensor required by a particular application of the PARC system. The container 1110 may provide an interface to a base station and operator control unit, and be configured to store, launch, and retrieve the UAV 1120. The tether management system 1130 includes a tether passthrough system 1132 allowing tethered flight of the UAV 1120 while the container 1110 doors are closed. In general, system 1100 may be an embodiment of the systems previously disclosed in FIGS. 1-10 or other remote launch/land system having doors and/or a cover than can open and close during operation.

The tether management system 1130 may be a ground-based component that includes a spool assembly that houses a tether spool assembly, which may be a cylindrical hub that holds a pre-wound amount of micro-filament tether to be attached to the UAV 1120. For example, in one embodiment, the spool assembly may hold 167.6 meters (550 feet) of more of micro-filament tether. In one embodiment, the micro-filament tether may be Kevlar-jacketed twisted copper pair with insulation that provides both a power link and a communication link between tether management system 1130 and UAV 1120, or other tether suitable for the desired implementation. The tether management system 1130 may be housed within and connected to the container 1110.

The container 1110 may include or be connected to an assembly that houses a power input, which may include voltage conversion electronics in an environmentally sealed enclosure. The assembly may also include a high voltage output port to supply high voltage to the tether management system 1130, which delivers the high voltage via the tether 1140 to the UAV 1120. A data platform adapter/media converter (DPA/MC) may serve the function of connecting the operator control unit to the base station while also providing electrical shock hazard isolation. The DPA/MC port may include an optical port to connect to the base station via a fiber optic cable, an Ethernet port, or other communications port or system. The operator control unit may be a ruggedized laptop or other computing device equipped with and able to execute an operator control application enabling control of the UAV 1120. Further details regarding the operation of tethered and untethered vehicles can be found in U.S. Pat. Nos. 7,510,142, 7,631, 834, and 11,423,790, the entire contents of which are incorporated herein by reference.

The container 1110 includes one or more doors and/or a cover configured to open for launch and land operations and close to protect the UAV 1120 when stored inside the container 1110. The container 1110 may further include a launch/land pad or platform (e.g., such as disclosed herein with respect to FIGS. 1-10) that may be deployed (e.g., raised) for take-off and landing of the UAV 1120 and positioned inside the container 1110 (e.g., lowered) during storage.

The system 1100 is further configured with a tether passthrough system 1132 that enables the container 1110 doors/cover to close while the tethered UAV is in flight. In some embodiments, the container 1110 may be implemented as a tethered UAV launch and recovery box (LRB) including a tether management system 1130 and tether passthrough system 1132 as disclosed herein. The tether passthrough system 1132 includes a tether guide configured for positioning in an opening in the doors, allowing the tether to pass freely through the doors when closed with minimal wear and tear on the tether. The doors may be closed during tethered flight/operation to protect the interior of the container from environmental conditions, such as weather and dust ingress into the container 1110. A plug, lid, cover, or other closure may be used to further seal the opening in the door(s) during storage of the UAV 1120 in the container 1110 when the UAV 1120 is not in operation.

In various embodiments, the tether guide is configured to securely fit into the opening formed in one or more doors of the container 1110, allowing the tether to pass through. The tether passthrough system further includes a lift mechanism configured to position the tether guide into the opening when the doors are closed during tethered UAV 1120 flight, and remove the tether guide from the opening during launch, land, and storage. The tether management system 1130 may further include a cover or plug to block the opening when the doors are closed during storage.

Figure 12:
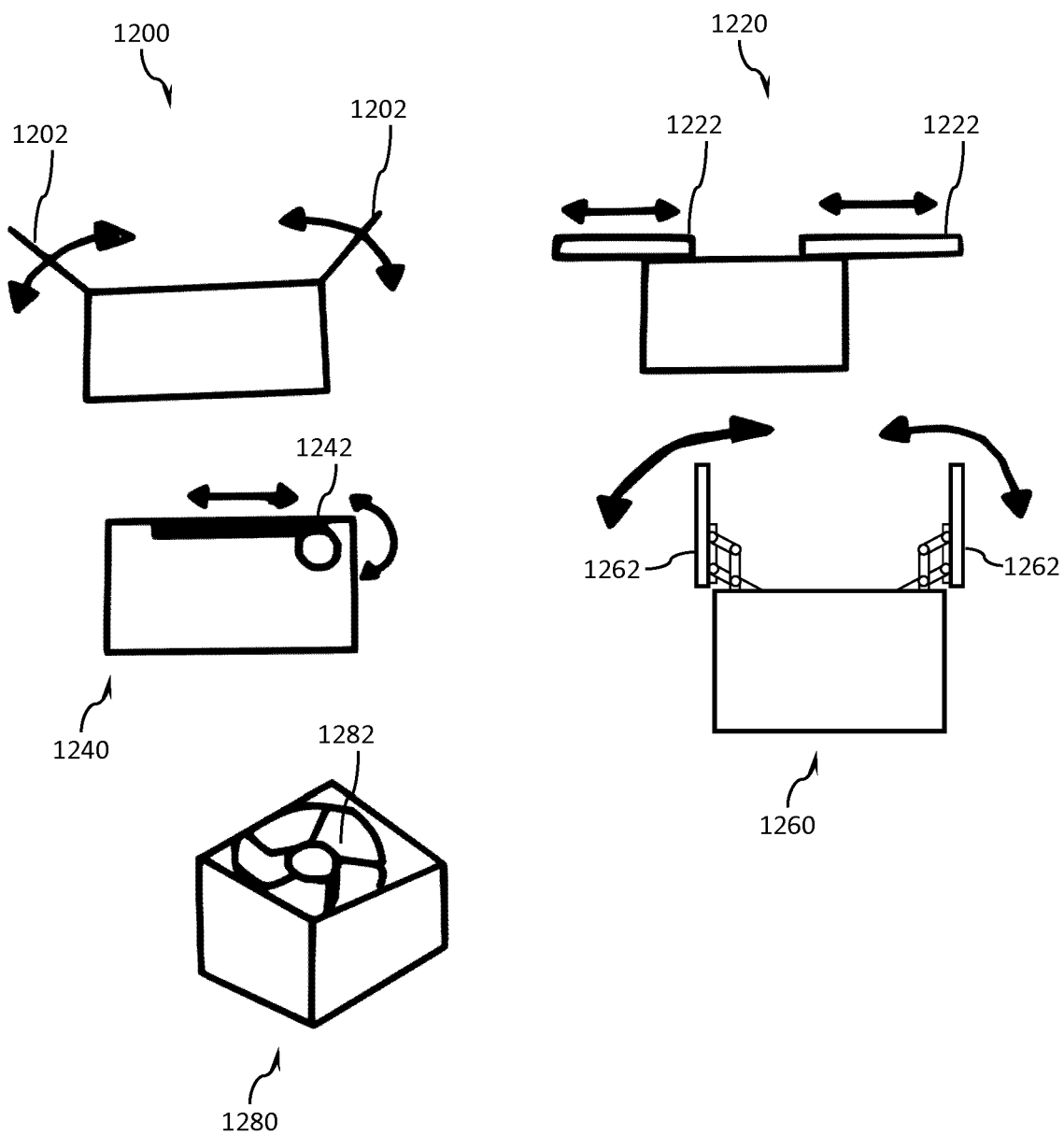
FIG. 12 illustrates example door/cover implementations, in accordance with various embodiments of the present disclosure.

The tether management systems disclosed herein may be used with a variety of container and door implementations. For example, as illustrated in FIG. 12, various embodiments may include a container 1200 including one or more hinging doors 1202, a container 1220 including one or more sliding doors 1222, a container 1240 including one or more roller doors 1242, a container 1260 including one or more four bar linkage doors 1262, a container 1280 including an aperture cover 1282, or other container enclosure systems and methods.

In some embodiments, at least one opening is formed in the door(s) of the container enabling the tether guide to pass through the door when the container is closed, protecting the interior of the container during UAV flight. In various embodiments, the opening is formed in the door(s) such that the tether of an inflight UAV is able to freely pass into the opening as the door is closed, allowing the tether guide to be positioned into the opening from inside the container. For example, as illustrated in FIG. 13A, one example implementation includes a container 1310 having two doors 1312 that hinge open/closed from opposite sides of the container 1310. An opening 1314 (e.g., a hole) is formed in the doors to allow the tether to pass through during flight when the doors 1312 are closed. In this implementation, complementary semi-circular openings 1314 are formed in each of the two doors 1312 to form a circular opening approximately two inches in diameter when the doors 1312 are closed. During flight, the opening 1314 allows the tether to pass through providing power and communications to the UAV. In some embodiments, the edges of the opening may be formed to provide a taper that substantially matches a taper of the tether guide and/or a plug, allowing the opening 1314 to be sealed against the tether guide and/or plug when positioned in the opening. In some embodiments, the plug may be similar to a tether guide without the passthrough hole (e.g., a solid plug having substantially the same exterior shape).

When the UAV is stowed, the hole is covered/plugged to further protect the interior of the container. For example, as illustrated in FIG. 13B, two doors 1320 are closed, forming a hole 1322. To cover the hole, a cover 1324 may be hingedly connected via a hinging member 1326 allowing the cover 1324 to open and close the hole 1322. In some embodiments, such as illustrated in FIG. 13C, a tapered rubber plug 1334 is positioned into the opening 1332 to seal out weather and dust. The edges of the opening may be formed to provide a taper substantially matching the plug 1334, allowing the opening 1332 to be sealed against the plug when pressure is applied to the plug 1334. In some embodiments, the plug 1334 is attached to an arm and/or linkage assembly 1338 that is moved by an actuator 1336 to position the plug 1334 into the opening. The position and configuration of the actuator 1336 and arm/linkage assembly 1338 may depend on various design choices implemented in the container. In various embodiments, the actuator 1336 and arm/linkage assembly 1338 are positioned to avoid interference with the launch/land/storage operations of the container. For example, the actuator 1336 may be attached near the top of an interior side wall of the container, on the inside of one of the doors, or in another appropriate position. The actuator 1336 may operate to rotate and/or raise/lower the plug 1334 between a storage position and the opening 1332, which may include rotating/positioning the plug under the opening and raising the plug into the opening to a resting position that may include applying pressure to secure the plug to seal the opening.

In some embodiments, such as illustrated in FIGS. 13B and 13D, a cover may be configured to close the when not in use and open when the tether guide is positioned in the opening. For example, as illustrated in FIG. 13D, an opening 1342 is closed by a cover 1344 that is hingedly connected to the door and biased to the closed position (e.g., via a spring). When a tether guide 1348 is positioned into the opening 1342, a protruding member 1346 attached to the cover 1344 engages with a surface of the tether guide 1348 which pushes the cover 1344 open while the tether guide 1348 is in position. When the tether guide 1348 is lowered out of the opening, the pressure on the protruding member 1346 is released, allowing the cover 1344 to close over the opening 1342.

Figure 14A:
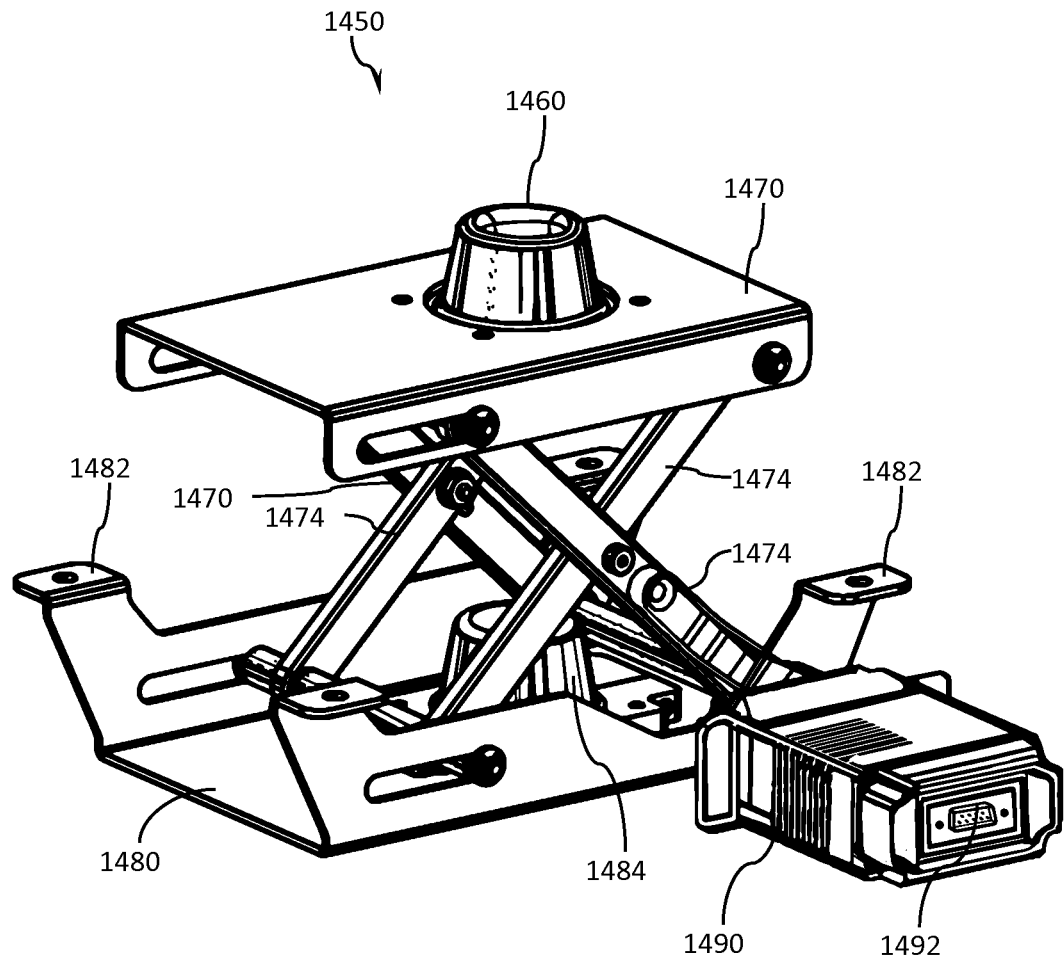
FIG. 14A illustrates an example tether guide positioning system, in accordance with one or more embodiments of the present disclosure.
Figure 14B:
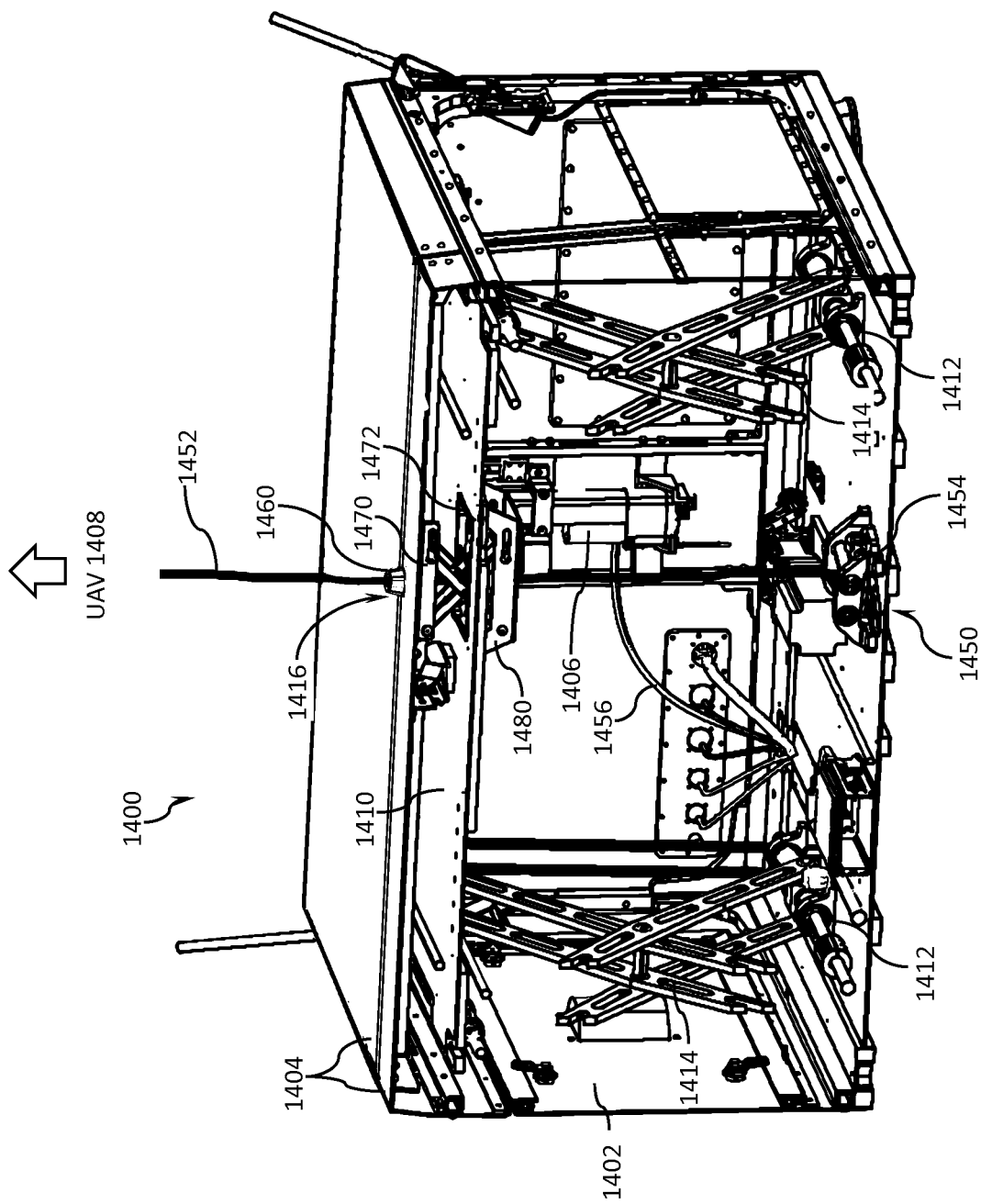
FIG. 14B illustrates a container including the tether guide positioning system of FIG. 14A, in accordance with one or more embodiments of the present disclosure.
Figure 14C:
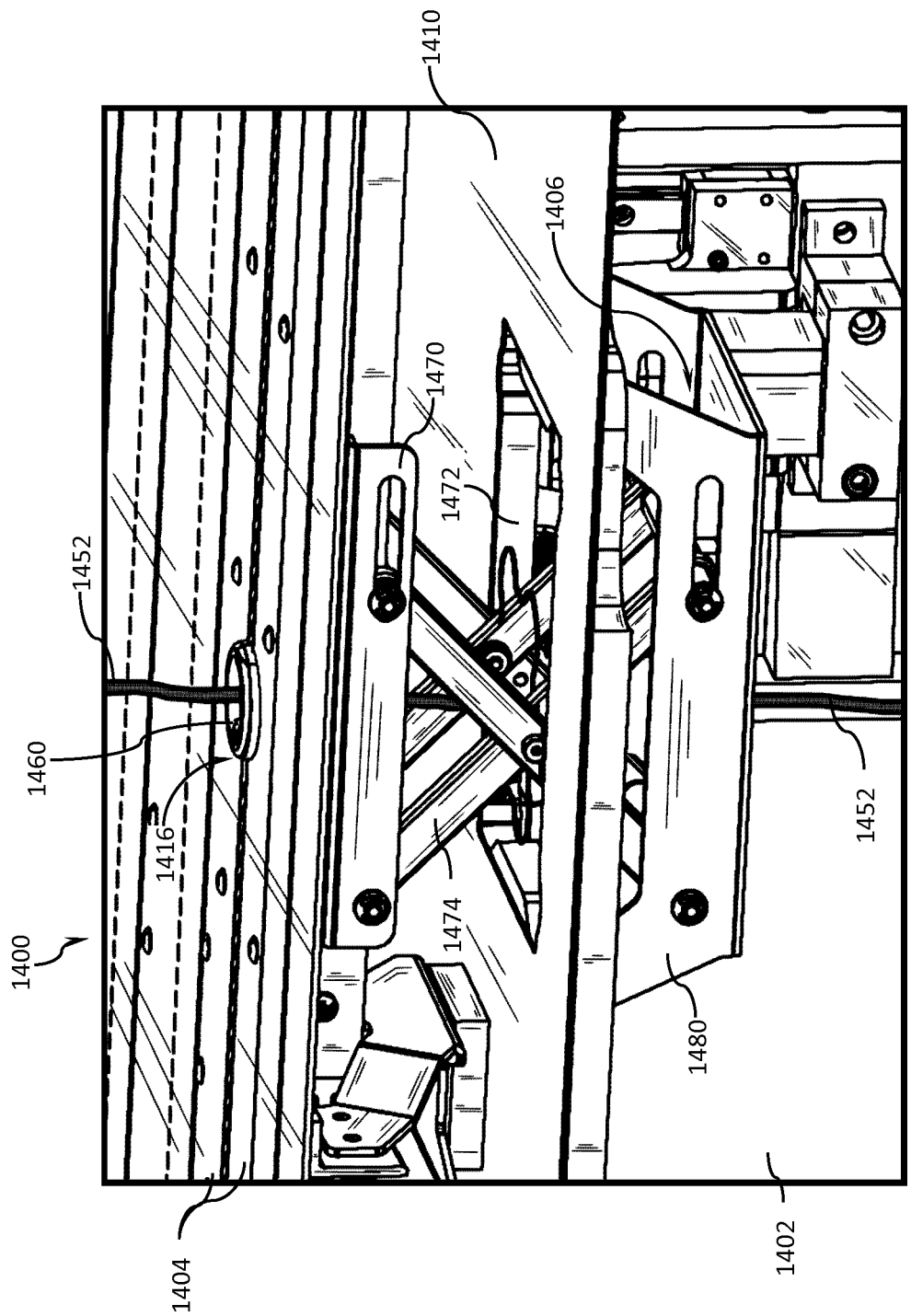
FIG. 14C illustrates the tether guide positioning system of FIG. 14A implemented on the landing platform of the container of FIG. 14B, in accordance with one or more embodiments of the present disclosure.

Referring to FIGS. 14A-C, an example launch/land system 1400 including a tether passthrough system will now be described, in accordance with one or more embodiments. It will be appreciated by those skilled in the art that the systems and methods described herein with reference to FIGS. 1-11 may be adapted for a tethered UAV using implementations of the tether management system and tether passthrough system as described herein. A system 1400 includes a container 1402 for storing and launching a UAV (not shown) having one or more doors 1404 (e.g., a protective cover) to protect the UAV and internal components of the container 1402. In various embodiments, the container 1402 may be generally box-shaped, cylindrically-shaped, or have another other shape appropriate for storing and launching a UAV as described herein.

In the illustrated embodiment, each door 1404 is pivotably connected to the container 1402. The door 1404 may be connected to the container 1402 through one or more hinges 1207 or similar connector and may include a spring to bias the door closed when not held open. In the illustrated embodiment, the door 1404 is opened and closed via an actuator 1406. In some embodiments, the actuator 1406 may be configured to slide a base plate along a track to raise and/or lower an articulating arm to open and close, respectively, the corresponding door 1404.

The container 1402 further includes a landing platform 1410 and/or one or more actuators 1412 which activate one or more assemblies 1414 (e.g., arms, hinges, tracks, etc.) to raise and/or lower the landing platform 1410. In operation, the landing platform 1410 is raised (as illustrated, e.g., in FIG. 14D) to allow for the launching and/or landing of the UAV thereon. As previously described herein, the landing platform 1410 may be lowered to store the UAV within the container 1402. Thus, the system 1400 includes a landing platform 1410 that may be raised and lowered to change states from the protective storage state to the unfolded state for extending the landing platform size.

In the illustrated embodiment, the container 1402 is configured for tethered UAV operation and includes a tether management system 1450 that includes a tether 1452, a spool assembly 1454 that houses a tether spool, which may be a cylindrical hub that holds a pre-wound amount of micro-filament tether to be attached to the UAV. For example, in one embodiment, the spool assembly may hold 167.6 meters (550 feet) of micro-filament tether. In one embodiment, the micro-filament tether may be Kevlar-jacketed twisted copper pair with insulation that provides both a power link and a communication link between tether management system 1450 and the UAV. The tether management system 1450 may be housed within and connected to the container 1402. The container 1402 may include or be connected to an assembly that houses a power input, which may include voltage conversion electronics in an environmentally sealed enclosure. The assembly may also include a high voltage output port to supply high voltage to the tether management system 1450, via a power line 1456 which delivers the high voltage via the tether 1452 to the UAV and to the tether management system 1450.

In some embodiments, the container doors 1404 are configured to close during UAV flight. The tether management system includes a bottom platform that is attached to the landing platform 1410. The bottom platform provides support for a lifting assembly to raise and lower the top platform. In a lowered position, the top platform is lowered into or adjacent to an opening in the landing platform 1410. This allows the UAV to land on the landing platform for storage. During flight, the doors 1404 are closed and the top platform is raised to push the tether assembly into a hole formed in the door, allowing the tether to pass through.

To launch the UAV 1408, the doors 1404 open, and the platform 1410 raises to the launch position. The UAV 1408 takes off from the platform, which may be inside or raised to or above the top of the enclosure. The tether 1452, which powers the UAV 1408, rises through an opening in the launch pad up to the UAV 1408 which is in flight. Where the tether 1452 passes through the doors 1404, it is surrounded by a tether guide 1460, which is implemented as a substantially smooth collar which mitigates damage to the tether. The tether guide 1460 can be lifted above the surface of the platform 1410 by an actuator 1406 (e.g., a scissor lift mechanism) to a position where it will mate with the opening 1416 where the doors 1404 meet. The opening may include tapered sides that are adapted to engage the tapered tether guide 1460. Having the path of the tether 1452 controlled by the rigid collar of the tether guide 1460 helps to prevent the tether 1452 from getting pinched between the doors 1404 as they are closed. In some embodiments, the tether guide 1460 can be manually separated into two halves by undoing several fasteners, allowing the tether 1452 (which may have a large ring at one end and is fastened to a spool assembly 1454 at the other) to be removed for servicing.

After the doors 1404 are opened and the UAV 1408 has launched the tether guide 1460 rises from the platform 1410 into position in the opening 1416. The plug or cover over the opening (e.g., the plug/cover implementations of FIGS. 13A-D) may be moved out of the door opening by the tether guide 1460 (or through another means, such as an actuator as described with reference to FIG. 13C). In some embodiments, the doors 1404 close forming the opening and the tether guide 1460 is moved into position in the opening. In some embodiments, the tether guide 1460 is first moved into position and then the doors 1404 close around and mate with the tether guide 1460. To stow the UAV the operations are reversed.

In a landing sequence, the doors are opened, and the top platform is lowered to a landing positioned to facilitate landing of the UAV. In some embodiments, the hole in the doors is automatically closed (e.g., via a hinged cover). In some embodiments, a plug may be provided for insertion into the hole while in the storage state. For example, an articulating arm by be configured to maintain the plug on a side of the container, swing the plug under the hole via one or more arms/assemblies and raise the plug into the hole via an actuator.

Closing the doors during operation of the UAV 1408 provides many advantages. By keeping the doors closed during a tethered flight, for example, the landing guidance system which the UAV uses to locate the landing pad (e.g., landing pad and/or inside of the open doors) may be kept clean. The interior of the container, including various components and electronics are further protected from the outside environment. Further, in some scenarios open doors could possibly extend beyond the "closed" system's envelope when in the "open" state, which makes the open doors more vulnerable to damage, such as when positioned on a moving vehicle.

The tether guide 1460, which passes through the doors and has the tether 1452 sliding against it, provides a low friction interface between the tether 1452 and the tether guide 1460. In various embodiments, the tether guide 1460 may include rollers, bearings, or other low friction components, and/or be constructed using low friction materials and/or low friction coatings. The lower friction materials or coatings may be selected to survive against high wear including heat and friction from the tether 1452 rubbing against the tether guide 1460. In various embodiments, the surfaces of the tether guide 1460 configured to interface with the tether 1452 are seamless and designed without edges that could possibly cut, wear, or otherwise damage the tether 1452. The tether 1452 is a cable that is similarly constructed to withstand wear against the tether guide 1460, including providing a low friction interface with the tether guide 1460. It will be appreciated that the interior surfaces of the tether guide 1460 may be curved and take any shape that provides low friction, freedom of movement for the tether 1452 therein. It will be further appreciated that the exterior surface of the tether guide 1460 includes surface areas that are not likely to engage the tether 1452 during operation and may comprise other shapes (e.g., including corners) and higher friction materials as desired. For example, while a circular opening 1416 and correspondingly shaped tether guide 1460 are illustrated, the opening 1416 and tether guide 1460 may comprise other complementary shapes, such as a rectangular opening/tether guide.

The tether management system 1450 includes a tapered tether guide 1460 on an upper platform 1470 that is positioned into the opening 1416 by a motor 1490. In the illustrated embodiment, a lower platform 1480 is attached to the landing platform 1410 of the container 1402, beneath an opening 1472 in the landing platform that allows the first platform 1470 to pass through. The lower platform 1480 may be connected to the landing platform through one or more connection points 1482 which enable one or more fasteners to attach the lower platform 1480 to the landing platform 1410, such as screws, rivets, bolts or other suitable attachment components. The lower platform 1480 may further include a second tether guide 1484 providing an additional low friction pathway through the tether passthrough system.

The lower platform 1480 provides a base support for a lifting mechanism configured to move the upper platform 1470 between a first position, where the upper platform 1470 is substantially aligned with the landing platform 1410 (e.g., inside the opening 1472 and substantially flush with the landing platform 1470), and a second position (as illustrated in FIGS. 14B-C) where the upper platform 1470 is raised to position the tapered tether guide 1460 through the opening 1416 formed in the closed doors 1404. The lifting mechanism may include the motor 1490, one or more arms 1474, and a communications interface 1492.

During operation, the lower platform 1480 moves up and down with the landing platform 1410. When the UAV is in a storage position, the upper platform 1470 may be in a lowered position allowing the UAV to sit on the landing pad for storage. In one embodiment, the upper platform 1470 is substantially aligned with the landing pad and the tether 1452 passes through the tether guide 1460 to connect to the UAV. During a launch sequence, the landing pad 1410 is raised and the doors 1404 opened to a launch configuration. In some embodiments, the landing platform 1410 is raised adjacent to or above the top of the container 1402.

After launch, the tether 1452 passes through the tether guides 1460 and 1484 to the UAV 1408, and the doors 1404 are closed. In one embodiment, the landing platform 1410 may be lowered, if needed, to provide clearance to allow the doors 1404 to close. The upper platform 1470 is raised (contemporaneously or after the landing platform is moved) to position the tether guide 1460 through the opening 1416 in the doors 1404. In some embodiments, the three components (landing platform 1410, doors 1404, and upper platform 1470) may be moved simultaneously into the tether passthrough position. position. In other embodiments, the components may be moved in a sequence controlled by a logic device. In some embodiments, the opening 1416 includes a cover having a spring-loaded flap that is pushed and held open by the tether guide 1460.

During a landing operation, the doors 1404 are opened, the upper platform 1470 is lowered flush with the landing platform 1410 and the landing platform 1410 is moved into a launch/land position to receive the UAV. As the upper platform 1470 is lowered, the spring-loaded flap that is pushed open by the tether guide is released allowing it close over the opening 1416 when the doors 1404 are closed. In various embodiments, the hole cover could include a single hinged flap on one door, or two hinged flaps covering half of the opening (one half per door). In some embodiments, a cover or plug may be used that is operated by ab activating mechanism that may be similar to the mechanisms used to open/close to the doors 1404 as described herein, but on a smaller scale.

After the UAV 1408 lands, the tether 1452 retracts and the landing platform 1410 is lowered to position the UAV 1408 inside the container 1402. It will be appreciated that in some designs, the tether guide 1460 may be formed on the landing platform 1410 itself, which may be configured to raise up to position the tether guide 1460 into the opening 1416 in the tether passthrough position. In other embodiments, the compact nature of the container design, which includes various components for opening and closing the doors, extending a landing platform, and other features, may dictate the use of alternative lifting mechanisms and arrangements of the tethered passthrough system consistent with the present disclosure.

For example, alternative designs or methods for raising the tether guide, which the doors seal against allowing the tether cable to pass through the doors, could include a scissor lift, telescoping mast, zipper mast, 4-bar linkage, and other suitable designs. Alternative designs to the cover/plug used to close the hole in the doors which the tether guide passes through could also be used provided the cover/plug sufficiently covers the hole when closed and can be opened/removed by the system during tethered UAV flight.

Figure 15:
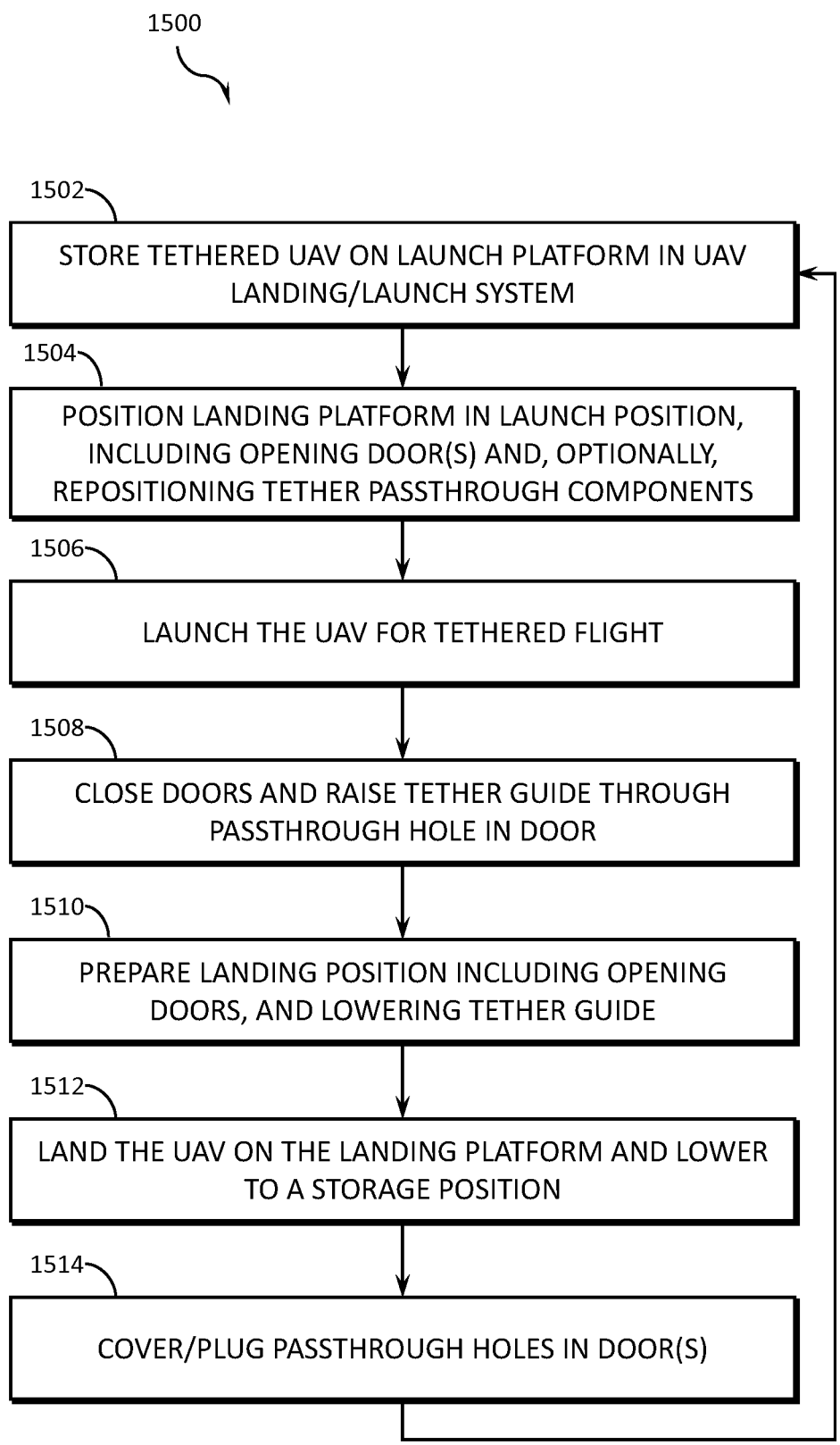
FIG. 15 illustrates a flow diagram of a process for operating a tethered UAV land/launch system, in accordance with one or more embodiments of the present disclosure.

A process for tether passthrough UAV launch and landing will now be described with reference to FIG. 15, in accordance with one or more embodiments of the present disclosure. For explanatory purposes, process 1500 is described with reference to FIGS. 1-14C. Note that one or more operations in process 1500 may be combined, omitted, and/or performed in a different order as desired. According to various embodiments, process 1500 may be performed by a logic device, such as logic device 126 of UAV 106, controller 182 of landing platform 108, the logic device 150 for base station 146, or a combination of the aforementioned logic devices, which may be communicatively coupled to execute the operations of process 1500.

In block 1502, a tethered UAV is stored on a landing platform of a UAV landing/launch system. In some embodiments, the UAV is stored inside of a container housing with a closed cover/doors, providing protection from external elements such as weather and debris. In various embodiments, the UAV landing/launch system may be a standalone system, a component of a larger system comprising a plurality of landing/launch systems, mounted to a vehicle, or used in another arrangment. In some embodiments, an operator terminal may be used to prepare the tethered UAV for flight, which may include configuring the UAV for its next mission, such as programming a flight path and defining image capture objectives.

In block 1504, the landing platform is moved to the launch position. In some embodiments, the operator terminal transmits instructions to the UAV landing/launch system (e.g., UAV land/launch system 200 from FIG. 2) to prepare the UAV for launch. The control system of the UAV landing/launch system controls one or more actuators to open the cover, raise the UAV through the opening in the UAV landing/launch system opening, and extend any articulated segments. In some embodiments, one or more actuators raise the landing platform, which pushes open the cover. In some embodiment, the cover is connected to one or more actuators that are instructed to open and close the cover.

In some embodiments, tether passthrough components, such as plug to seal the hole in the doors, may be used. These components may be move in this step. For example, in embodiments including an actuator for positioning the plug in the passthrough hole, the actuator may be instructed to move the plug out of the launch path of the UAV.

In block 1506, the UAV is launched for tethered flight. In some embodiments, the UAV is retained on the launch platform through an attachment mechanism and the UAV launch sequence includes releasing the attachment mechanism. The launch and flight of the UAV may be preprogrammed and/or controlled by as instructed by the operator terminal. For example, during flight, the operator may control and/or monitor the UAV(s) using the operator terminal. As the UAV takes flight, the tether is extended from the tether management system through the tether guides of the tether passthrough system.

In block 1508, the doors are closed and the tether guide is raised through the passthrough hole in the door. In some embodiments, the tether guide is raised before or simultaneously with the closing of the doors, which positions the tether above the pathway of the doors as they close on the tether guide. As the doors close, the tether guide fits into the passthrough opening formed in the doors closing off the interior of the box from external debris.

In block 1510, the landing platform is prepared for the return of the UAV. The doors are open, the tether guide is lowered to the landing platform, the landing platform is moved into the landing position, and any landing platform extensions are extended.

In block 1512, the UAV returns to the landing platform. In some embodiments, the UAV is guided to land towards the cented of the landing platform, but may not be perfectly aligned due to error, wind, or other factors. In some embodiments, the UAV may be aligned on the landing platform via one or more actuators (if available) to sequentially raise one or more articulated sections of the extended landing platform. The landing platform is then lowered to the storage position where it is stored for further use.

In some embodiments, the UAV may be connected to charge batteries and/or communications with a control system, such as the operator terminal. In the storage position, the cover is closed (e.g., via one or more actuators, automatically as the lowered landing platform removes a bias maintaing the cover in an open positon, etc.). The UAV is stored for protection, charging and communication with the operator terminal. In some embodiments, the UAV may download flight data and other acquired information to the operator terminal.

In block 1514, in embodiments with mechanically controlled cover(s)/plug(s) for the passthrough hole in the door(s), the control system instructs the corresponding actuator to reposition the cover/plug to close the hole to protect the interior of the system from environmental elements during storage.

As set forth with respect to FIGS. 11-15, various embodiments of systems and methods for tethered passthrough UAV flights are disclosed. In some embodiments, the system includes a container configured to store an unmanned aerial vehicle (UAV), the container comprising a housing and one or more doors, a platform secured within the container and adapted for launching and landing the UAV, and a tether passthrough system configured to provide a tether pathway for a tether from an interior of the housing to the UAV through the at least one door during a tethered UAV flight. The system may further include a tether management system secured within the housing, such that the tether has a first end attached to the tether management system and a second end attached to the UAV.

In some embodiments, the tether passthrough system includes a tether guide configured to move between a first position facilitating storage of the UAV and a second position during the tethered UAV flight. At least one door may be configured to move between a closed position substantially covering an interior of the housing and an open position providing access to the interior of the housing facilitating launching and landing of the UAV. An opening may be formed in the at least one door such that the tether guide, when in the second position, is configured to fit securely within the opening, allowing the tether to pass through the at least one door. In some embodiments, the at least one door includes two adjoining doors and the opening may be formed as a substantially circular opening comprising a half circular opening formed in each of the two adjoining doors.

In some embodiments, a plug may be adapted to fit securely into the opening when the doors are closed to protect the interior of the housing. An actuator and assembly may be configured to position the plug into the opening during UAV storage, and position the plug outside of the opening during the tethered UAV flight. In other embodiments, a cover may be hingedly attached to the door and biased to close over the opening. The cover may be held open by the tether guide when the tether guide is in the second position.

In some embodiments, a method which may be performed by one or more system described herein, including one or more logic devices, includes storing an unmanned aerial vehicle (UAV) in a launch/land container comprising a housing, one or more doors having at least one opening formed therein, a platform secured within the container and positionable between a storage position and a launch/land position, and a tether passthrough system. The method may further include positioning the one or more doors and the platform to launch the UAV, comprising opening the one or more doors and raising the platform to the launch position, positioning the tether passthrough system for tethered UAV flight, and closing the one or more doors around the tether passthrough system, the tether passthrough system providing a pathway for a tether from an interior of the housing to the UAV during a tethered UAV flight.

In some embodiments, the method further includes opening the one or more doors, retracting the tether passthrough system to the platform to facilitate landing the UAV, and closing the one or more doors to store the UAV in the launch/land container. The method may further include operating a tether management system to extend and/or retract the tether during UAV flight, wherein the tether has a first end attached to the tether management system and a second end attached to the UAV.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the present disclosure. It should also be understood that numerous modifications and variations are possible in accordance with the principles of the present disclosure. Accordingly, the scope of the invention is defined only by the following claims.

What is claimed is:

1. A system comprising:
   a container configured to store an unmanned aerial vehicle (UAV), the container comprising a housing and one or more doors;
   a platform secured within the container and adapted for launching and landing the UAV; and
   a tether passthrough system configured to provide a pathway for a tether from an interior of the housing to the UAV through the one or more doors during a tethered UAV flight.

2. The system of claim 1, further comprising:
   a tether management system secured within the housing;
   wherein the tether has a first end attached to the tether management system and a second end attached to the UAV.

3. The system of claim 1, wherein the tether passthrough system comprises a tether guide configured to move between a first position facilitating storage of the UAV and a second position during the tethered UAV flight.

4. The system of claim 3, wherein the one or more doors is configured to move between a closed position substantially covering an interior of the housing and an open position providing access to the interior of the housing facilitating launching and landing of the UAV.

5. The system of claim 4, wherein an opening is formed in the one or more doors;
   wherein the tether guide, in the second position, is configured to fit securely within the opening, allowing the tether to pass through the one or more doors.

6. The system of claim 5, wherein the one or more doors comprises two adjoining doors and wherein the opening is formed as a substantially circular opening comprising a half circular opening formed in each of the two adjoining doors.

7. The system of claim 5, further comprising:
   a plug adapted to fit securely into the opening when the doors are closed to protect the interior of the housing; and
   an actuator and assembly configured to position the plug into the opening during UAV storage, and position the plug outside of the opening during the tethered UAV flight.

8. The system of claim 5, further comprising:
   a cover hingedly attached to the one or more doors and biased to close over the opening;
   wherein the cover is held open by the tether guide when the tether guide is in the second position.

9. The system of claim 1, further comprising a logic device configured to control one or more motors to:
   open the one or more doors to facilitate launching of the UAV;
   position the tether passthrough system for the tethered UAV flight; and
   close the one or more doors around the tether passthrough system.

10. The system of claim 9, wherein the logic device is further configured to control the one or more motors to:
    open the one or more doors;
    retract the tether passthrough system to the platform to facilitate landing the UAV; and
    close the one or more doors to store the UAV in the container.

11. A method for operating the system of claim 1, comprising:
    opening the one or more doors to facilitate a launch of the UAV;
    positioning the tether passthrough system for the tethered UAV flight; and
    closing the one or more doors around the tether passthrough system.

12. The method of claim 11, further comprising:
    opening the one or more doors;
    retracting the tether passthrough system to the platform to facilitate landing the UAV; and
    closing the one or more doors to store the UAV in the container.

13. A method comprising:
    storing an unmanned aerial vehicle (UAV) in a launch/land container comprising a housing, one or more doors having at least one opening formed therein, a platform secured within the container and positionable between a storage position and a launch/land position, and a tether passthrough system;
    positioning the one or more doors and the platform to launch the UAV, comprising opening the one or more doors and raising the platform to the launch position;
    positioning the tether passthrough system for tethered UAV flight; and
    closing the one or more doors around the tether passthrough system, the tether passthrough system providing a pathway for a tether from an interior of the housing to the UAV during a tethered UAV flight.

14. The method of claim 13, further comprising:
    opening the one or more doors;
    retracting the tether passthrough system to the platform to facilitate landing the UAV; and
    closing the one or more doors to store the UAV in the launch/land container.

15. The method of claim 13, further comprising operating a tether management system to extend and/or retract the tether during UAV flight;
    wherein the tether has a first end attached to the tether management system and a second end attached to the UAV.

16. The method of claim 13, wherein the tether passthrough system comprises a tether guide configured to move between a first position facilitating storage of the UAV and a second position during the tethered UAV flight.

17. The method of claim 13, wherein the one or more doors is configured to move between a closed position substantially covering an interior of the housing and an open position providing access to the interior of the housing facilitating launching and landing of the UAV;
    wherein an opening is formed in the one or more doors;
    wherein the tether passthrough system is configured to fit securely within the opening during tethered UAV flight, allowing the tether to pass through the one or more doors.

18. The method of claim 13, wherein the at least one door comprises two adjoining doors and wherein the opening is formed as a substantially circular opening comprising a half circular opening formed in each of the two doors.

19. The method of claim 13, further comprising:
a plug adapted to fit securely into the opening when the doors are closed to protect the interior of the housing; and
an actuator and assembly configured to position the plug into the opening during storage, and to position the plug away from the opening during tethered flight.

20. The method of claim 13, further comprising:
a cover hingedly attached to the door and biased to close over the opening;
wherein the cover is held open by a tether guide of the tether passthrough system when the tether passthrough system is positioned in the opening.

\* \* \* \* \*

UNITED STATES PATENT AND TRADEMARK OFFICE
CERTIFICATE OF CORRECTION

| | | |
|---|---|---|
| PATENT NO. | : 12,378,013 B2 | Page 1 of 1 |
| APPLICATION NO. | : 18/627378 | |
| DATED | : August 5, 2025 | |
| INVENTOR(S) | : Neate et al. | |

It is certified that error appears in the above-identified patent and that said Letters Patent is hereby corrected as shown below:

In the Specification

Column 22, Line 14, change "to be scaled against" to --to be sealed against--.

Signed and Sealed this
Thirtieth Day of September, 2025

John A. Squires
*Director of the United States Patent and Trademark Office*